United States Patent
Nonaka et al.

(10) Patent No.: US 8,199,212 B2
(45) Date of Patent: Jun. 12, 2012

(54) IMAGE RECORDING AND PLAYBACK DEVICE, AND IMAGE RECORDING AND PLAYBACK METHOD

(75) Inventors: Osamu Nonaka, Sagamihara (JP); Naohiro Kageyama, Mitaka (JP)

(73) Assignee: Olympus Imaging Corp., Tokyo (JP)

( * ) Notice: Subject to any disclaimer, the term of this patent is extended or adjusted under 35 U.S.C. 154(b) by 397 days.

(21) Appl. No.: 12/432,350

(22) Filed: Apr. 29, 2009

(65) Prior Publication Data

US 2009/0273688 A1    Nov. 5, 2009

(30) Foreign Application Priority Data

May 3, 2008  (JP) .................. 2008-120796
Jun. 18, 2008 (JP) .................. 2008-159065

(51) Int. Cl.
*H04N 5/228* (2006.01)
(52) U.S. Cl. .................. 348/222.1; 348/208.99; 396/52
(58) Field of Classification Search .. 348/208.1–208.16, 348/208.99, 222.1; 396/52, 55
See application file for complete search history.

(56) References Cited

U.S. PATENT DOCUMENTS

| | | | |
|---|---|---|---|
| 5,436,660 A * | 7/1995 | Sakamoto .................. 348/229.1 |
| 7,162,151 B2 * | 1/2007 | Nonaka et al. .................. 396/52 |
| 7,626,612 B2 * | 12/2009 | John et al. .................. 348/208.4 |
| 7,777,781 B2 * | 8/2010 | Helbing et al. ............ 348/208.4 |
| 7,884,862 B2 * | 2/2011 | Ishii et al. .................. 348/240.3 |
| 7,982,776 B2 * | 7/2011 | Dunki-Jacobs et al. . 348/208.99 |
| 2003/0215010 A1 * | 11/2003 | Kashiwa .................. 375/240.02 |
| 2007/0025713 A1 * | 2/2007 | Hosono ........................... 396/72 |
| 2007/0237506 A1 * | 10/2007 | Minema et al. .................. 396/52 |
| 2008/0069551 A1 * | 3/2008 | Wakamatsu et al. ............ 396/55 |
| 2008/0088711 A1 * | 4/2008 | Border et al. ............... 348/222.1 |
| 2008/0137983 A1 * | 6/2008 | Shimano et al. .............. 382/266 |
| 2008/0158371 A1 * | 7/2008 | Trescott ..................... 348/208.7 |
| 2008/0211941 A1 * | 9/2008 | Deever et al. ................. 348/262 |
| 2009/0002501 A1 * | 1/2009 | Silsby et al. ............. 348/208.16 |

FOREIGN PATENT DOCUMENTS

| | | |
|---|---|---|
| JP | 2003-008948 | 1/2003 |
| JP | 2004-187124 | 7/2004 |

(Continued)

OTHER PUBLICATIONS

National Institute of Advanced Industrial Science and Technology Today, vol. 6, No. 3, pp. 28 and 29 (2006).
National Institute of Advanced Industrial Science and Technology Today, vol. 6, No. 3, (2006) pp. 28 and 29 with partial translation (1 pg.).

*Primary Examiner* — Tuan Ho
*Assistant Examiner* — Kent Wang
(74) *Attorney, Agent, or Firm* — John C. Pokotylo; Straub & Pokotylo

(57) ABSTRACT

An image processing device of the present invention comprises a storage section for storing first image data obtained by imaging in front of the imaging device body or using a telephoto lens, and second image data obtained by imaging behind the imaging device body or using a wide-angle lens; a movement pattern detection section for processing the first image data to detect a movement pattern of the first image represented by the first image data; a movement pattern determination section determining whether or not the movement pattern of the first image is unstable movement; and an image processing section for rewriting a part of the first image data, for which it has been determined by the movement pattern determination section that the movement pattern of the first image is unstable, using the second image data.

17 Claims, 20 Drawing Sheets

FOREIGN PATENT DOCUMENTS

| | | |
|---|---|---|
| JP | 2005-092657 | 4/2005 |
| JP | 2005-244791 | 9/2005 |
| JP | 2006-238326 | 9/2006 |
| JP | 2007-116361 | 5/2007 |

* cited by examiner

FIG. 3
(a)
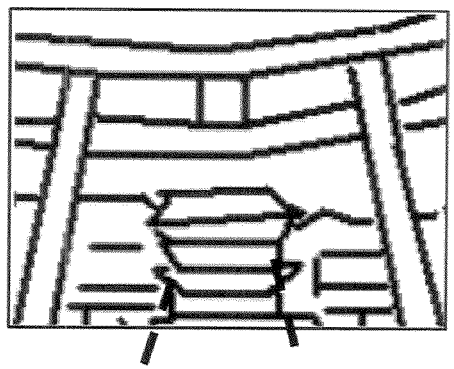
(b)
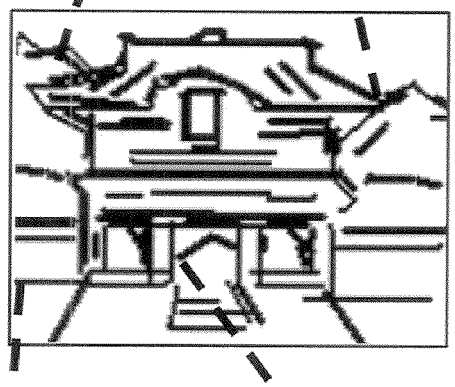
(c)

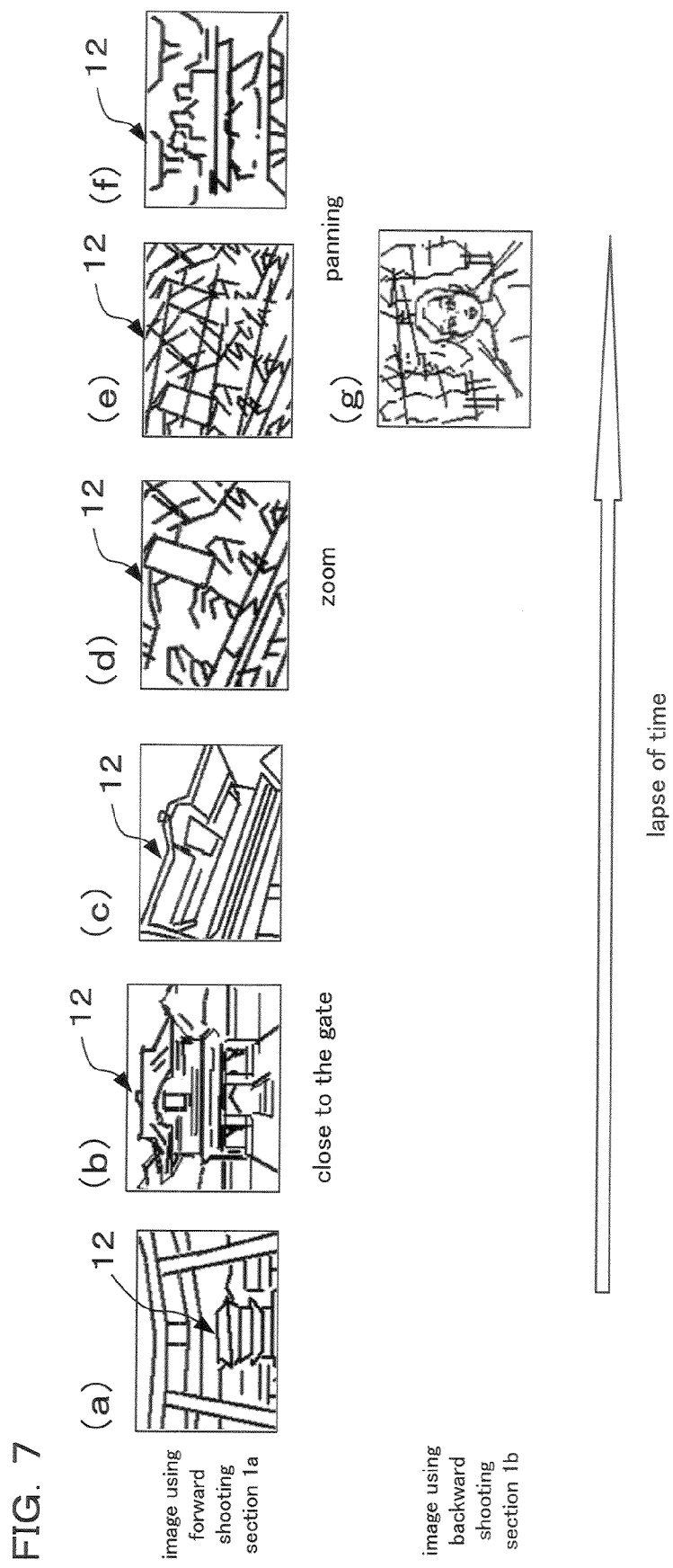

FIG. 19
(a) 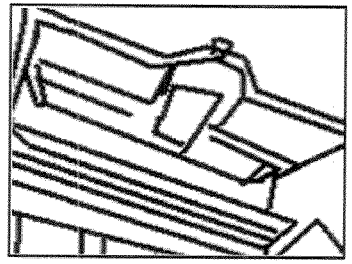
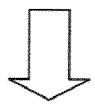
(b) 
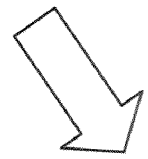
(c) 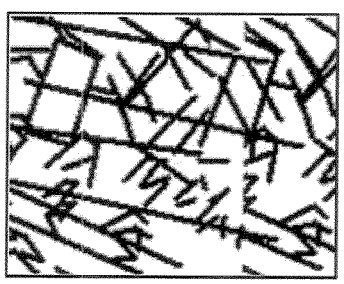  (e) 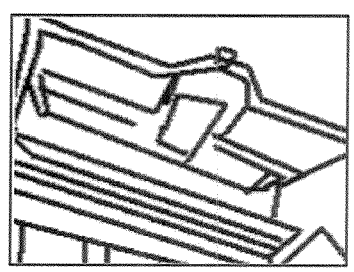
(d) 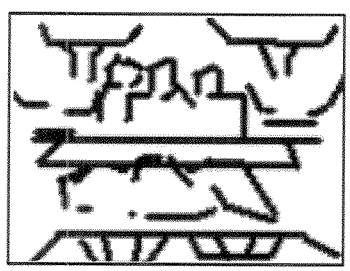
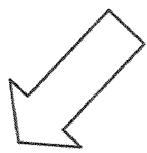

ered to as prior art 5).

IMAGE RECORDING AND PLAYBACK DEVICE, AND IMAGE RECORDING AND PLAYBACK METHOD

Benefit is claimed, under 35 U.S.C. §119, to the filing date of prior Japanese Patent Application Nos. 2008-120796 filed on May 3, 2008, and 2008-159065 filed on Jun. 18, 2008. These applications are expressly incorporated herein by reference. The scope of the present invention is not limited to any requirements of the specific embodiments described in the applications.

BACKGROUND OF THE INVENTION

1. Field of the Invention

The present invention relates to a image recording and playback device and an image recording and playback method, an image processing device, and an image processing method, and in detail relates to an image recording and playback device provided with two imaging sections, for processing moving images acquired by the two imaging sections, and to an image recording and playback method.

2. Description of the Related Art

Conventionally, a camera has been a device for taking still pictures, but in recent years, with the digitalization of image signals, by carrying out interframe compression on consecutively acquired images it has become possible to also use a camera as a device for taking moving pictures. It has therefore become possible for recent digital cameras to take moving pictures similarly to still pictures.

Also, there has recently been proposed a camera that, in addition to the normal photographing of things other than the photographer (hereafter referred to as Companion Shooting), carries out self photography (hereafter referred to as Self Shooting) to take a picture of the photographer themselves. For example, a portable terminal device having a camera, that is capable self photography and companion photography, with a single camera fixed to a mobile telephone, is disclosed in Japanese unexamined patent application No. 2005-244791 (laid-open Sep. 8, 2005, hereafter referred to as prior art 1) and Japanese unexamined patent application No. 2007-116361 (laid-open May 10, 2007, hereafter referred to as prior art 2).

Also, although digital cameras have become capable of taking both still pictures and movies, for users who have only taken still photographs they may not know what type of scenes are suited to taking movies, or not know at what point in time to stop shooting even if they do start shooting a movie, and often the resulting creation is unattractive and amateurish.

As a proposal for switching between the two types of image, a portable imaging and display device fitted with a camera, for switching display between a back of camera image taken facing towards the photographer, and a front of camera image taken facing towards companions, is proposed in Japanese unexamined patent application No. 2005-92657 (laid-open Apr. 7, 2005, hereinafter referred to as prior art 3). Also, an electronic camera for filling in with a still image when gaps appear in a movie, due to a still image being skipped during shooting of the movie etc. is proposed in Japanese unexamined patent publication No. 2003-8948) laid-open Jan. 10, 2003, hereafter referred to as prior art 4). Also, an imaging device for simultaneously photographing a first area and a second area while shooting a movie is proposed in Japanese patent publication No. 3778163 (laid-open Mar. 10, 2006, hereinafter referred to as prior art 5).

SUMMARY OF THE INVENTION

The present invention has been conceived in view of the above described situation, and an object of the invention is to provide an image recording and playback device that records and plays back movies, that enable shooting and playing back with variation so that the experience does not become tedious, and an image recording and playback method.

An image recording and playback device of the present invention comprises: an imaging section for taking a first image in front of an imaging device body and a second image behind the imaging device body, and respectively converting to first image data and second image data; a storage section for storing the first image data and the second image data; a movement pattern detection section for processing the first image data to detect a movement pattern of the first image represented by the first image data; a movement pattern determination section determining whether or not the movement pattern of the first image is unstable movement; an image processing section for rewriting a part of the first image data, for which it has been determined by the movement pattern determination section that the movement pattern of the first image is unstable, using the second image data; and an image display section for displaying the first image that has been processed by the image processing section, or the second image.

Also an image recording and playback method of the present invention comprises: taking a first image in front of an imaging device body and a second image behind the imaging device body, and respectively converting to first image data and second image data; storing the first image data and the second image data; processing the first image data to detect a movement pattern of the first image represented by the first image data; determining whether or not the movement pattern of the first image is unstable movement; replacing a part of the first image data, for which it has been determined that the movement pattern of the first image is unstable, using the second image data; and displaying the first image that has been processed, or the second image.

Further, an image processing device of the present invention comprises: a storage section for respectively recording the first image data and the second image data; a movement pattern detection section for processing the first image data to detect a movement pattern of the first image represented by the first image data; a movement pattern determination section determining whether or not the movement pattern of the first image is unstable movement; and an image processing section for rewriting a part of the first image data, for which it has been determined by the movement pattern determination section that the movement pattern of the first image is unstable, using the second image data.

Further, an image processing method of the present invention comprises: storing first image data and second image data; processing the first image data to detect a movement pattern of the first image represented by the first image data; determining whether or not the movement pattern of the first image is unstable movement; and replacing a part of the first image data, for which it has been determined that the movement pattern of the first image is unstable, using the second image data.

Further, an image playback device of the present invention comprises: a storage section for storing first image data and second image data respectively converted from a first image and a second image; a movement pattern detection section for processing the first image data to detect a movement pattern of the first image represented by the first image data; a movement pattern determination section for determining whether or not the movement pattern of the first image is unstable movement; an image processing section for rewriting a part of the first image data, for which it has been determined by the movement pattern determination section that the movement pattern of the first image is unstable, using the second image data; and an image display section for displaying the first image that has been processed by the image processing section, or the second image.

Further, an imaging device of the present invention comprises: an imaging section for generating first image data representing a first image of a first shooting range, and second image data representing a second image of a second shooting range that is wider than the first shooting range; a storage section for storing the first image data and the second image data; a determination section for determining whether or not movement of the first image is unstable; and an image data synthesis section for filling in gaps in the first image data at sections, in the first image data, that have been determined by the determination section to be unstable, using the second image data.

Further, an imaging method of the present invention comprises: generating first image data representing a first image of a first shooting range, and second image data representing a second image of a second shooting range that is wider than the first shooting range; storing the first image data and the second image data; determining whether or not movement of the first image is unstable; and filling in gaps in the first image data at sections, in the first image data, that have been determined by the determination section to be unstable, using the second image data.

Further, an imaging processing device of the present invention comprises: an image data storage section for storing first image data representing a first image of a first shooting range, and second image data representing a second image of a second shooting range that is wider than the first shooting range; a determining section for determining whether or not movement of the first image is unstable; and an image data synthesis section for filling in gaps in the first image data at sections, in the first image data, that have been determined by the determination section to be unstable, using the second image data.

Further, an image processing method of the present invention comprises: storing first image data and second image data; determining whether or not movement of the first image data is unstable; and filling in gaps in the first image data at sections, in the first image data, that have been determined by the determination section to be unstable, using the second image data.

Further, an imaging device of the present invention comprises: a first lens formed with a first fixed focal length; a first image sensor arranged the vicinity of the imaging plane of the first lens; a first imaging section for changing effective range of image data of the first image sensor to carry out electronic zooming; a second lens formed with a second fixed focal length that is different from the first fixed focal length; a second image sensor arranged in the vicinity of the imaging plane of the second lens; and a second imaging section for changing the effective range of image data of the second imaging section to carry out electronic zooming, wherein a focal length range that can be changed by the first imaging section and a focal length range that can be changed by the second imaging section do not overlap.

BRIEF DESCRIPTION OF THE DRAWINGS

FIG. 3 is drawings showing appearance when shooting a building or the like, as the subject, with (a) showing the overall subject, (b) showing close to the subject, and (c) showing the photographer.

FIG. 4A shows the appearance of shooting in front of a subject, and FIG. 4B shows the appearance of while panning in the vicinity of the subject.

FIG. 6A is panning with regular movement that is easy to see, while FIG. 6B shows the appearance of panning with irregular movement that is difficult to see.

FIG. 7 is drawings showing appearance of shooting a building, that is a subject, in the first embodiment of the present invention.

FIG. 18A is one example and FIG. 18B is another example, FIG. 19 is drawings showing appearance in the case of shooting a building etc., as a subject, with (a), (b), (c) and (d) sequentially showing appearance of the subject zooming up and down, in which (c) shows the appearance when the image is unstable because of zooming up, and (e) shows a wide-angle image in the same period.

FIG. 20A shows the structure of the wide-angle shooting section and FIG. 20B shows the structure of the telephoto shooting section.

FIG. 22A is a flowchart showing a viewing angle switching subroutine, and FIG. 22B is a drawing for describing within a first limit and within a second limit.

FIG. 25A is playback display of only a single taken image, while FIG. 25B shows the appearance of playback display of two taken images.

DETAILED DESCRIPTION OF THE PREFERRED EMBODIMENTS

In the following, preferred embodiments using a camera adopting the present invention will be described using the drawings. A camera of a first embodiment of the present invention, in order to acquire movies, comprises two imaging sections, namely an imaging section for shooting in front of the camera, and an imaging section for shooting behind the camera. Acquisition of image data for a movie is commenced in response to operation of a release button, and acquired data is stored in a storage medium. Also, the camera of the first embodiment prevents taking of unappealing scenes, in cases where an image has been ruined due to unstable framing, such as hand shake or panning, by switching from the front image to the rear image.

Figure 1:
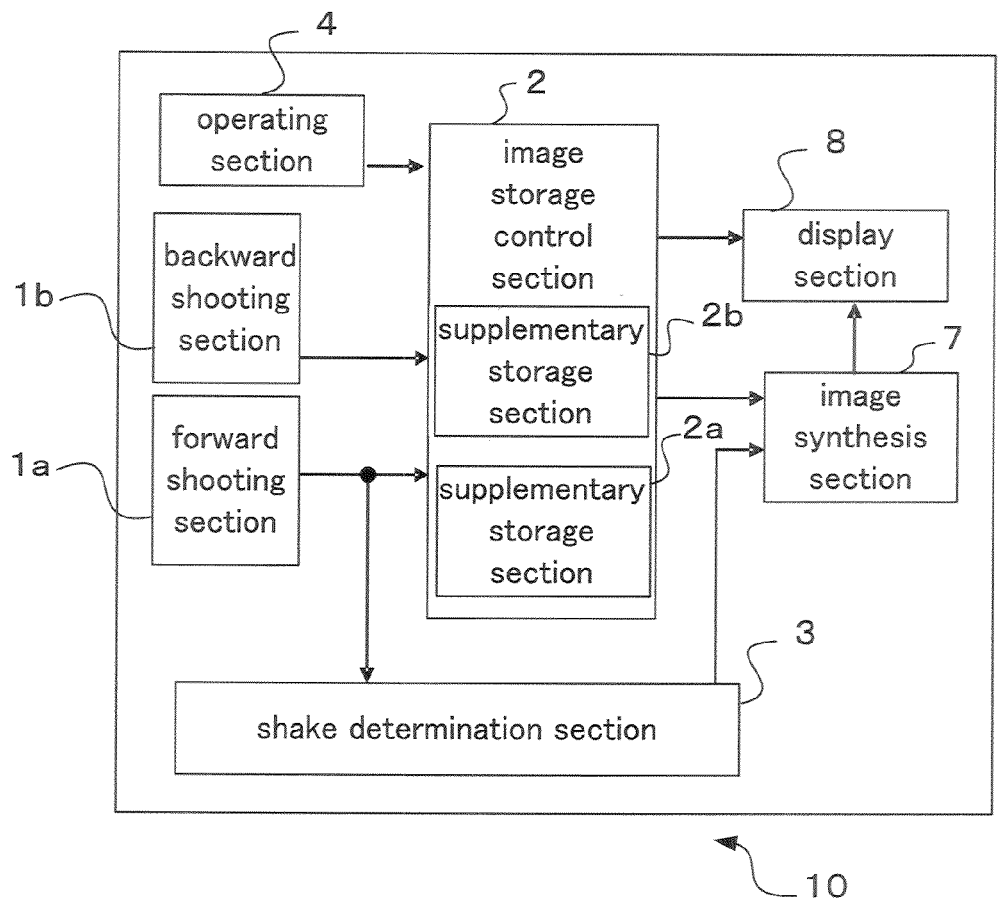
FIG. 1 is a block diagram showing the structure of a camera relating to a first embodiment of the present invention.

FIG. 1 is a block diagram showing the structure of a camera relating to the first embodiment of the present invention, and the camera 10 is a digital camera for shooting a subject and acquiring images. The camera 10 comprises a forward shooting section 1a, a backward shooting section 1b, an image recording control section 2, a shake determining section 3, an operating section 4, an image synthesis section 7 and a display section 8.

Figure 2:
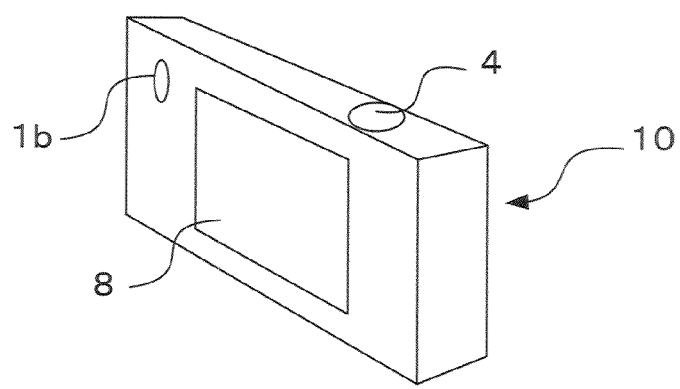
FIG. 2 is an external perspective drawing looking at a camera of a first embodiment of the present invention from a rear surface.

The forward shooting section 1a is arranged on the front of the body of the camera 10, and is mainly used as an imaging section for companion shooting. The backward shooting section 1b, as shown in FIG. 2, is arranged on the back of the body of the camera 10, and is mainly used as an imaging section for self shooting. The forward shooting section 1a and the backward shooting section 1b each have an optical system for forming a subject image, and an image sensor for photoelectric conversion of the subject image, and there is provided an image processing section or the like for processing image signals output from the respective image sensors, and outputting the respective image data.

An image recording control section 2 performs overall control of the camera 10, and records image data of a movie based on image signals output from the forward shooting section 1a and the backward shooting section 1b. The image recording control section also has a supplementary storage section 2a for temporarily storing image data output from the forward shooting section 1a, and a supplementary storage section 2b for temporarily storing image data output from the backward shooting section 1b. In this embodiment, well as being stored as movies, the front movie data and back movie data are respectively temporarily stored in the supplementary storage sections 2a and 2b.

The shake determination section 3 determines hand shake applied to the camera 10 or a panning operation by the photographer, etc. Specifically, this shake determination section 3 is input with image data from the forward shooting section 1a, and determines whether or not a movement pattern is unstable, such as whether the image changes irregularly and if there is a lot of change in the image, from changes in the image data. Besides analyzing image data, it is also possible to provide a sensor such as an accelerations sensor, angular acceleration sensor, gyro etc., and to carry out the determination based on output from this sensor. Well-known shake reduction processing is then carried out based on output of the shake determination section 3.

The operating section 4 is an operating member such as a release button provided at an upper part of the camera 10. If the release button is operated, the camera 10 commences a movie shooting operation, and if the release button is operated again the movie shooting is stopped. The operating state of the operating section 4 is conveyed to the image recording control section 2.

As shown in FIG. 2, the display section 8 includes a display device such as a liquid crystal monitor arranged on the rear surface of the camera 10, and performs playback display of a movie stored in the image storage section 2. Also, a movie acquired by the forward shooting section 1a or the backward shooting section 1b is presented in so-called live view display when viewing the subject image.

The image synthesis section 7 combines an image acquired by the forward shooting section 1a and an image acquired by the backward shooting section 1b. A combined image generated by this image synthesis section 7 is displayed on the display section 8. The previously described supplementary storage sections 2a and 2b are temporary storage sections for image synthesis using image data acquired by each of the shooting sections.

The image synthesis by the image synthesis section 7 involves receiving input of determination results of the shake determination section 3 and performing image switching based on shake output. As will be described later, in this embodiment, a movie acquired by the forward shooting section 1a is stored, but if a shake state is detected by the shake determination section 3 the image acquired by the forward shooting section 1a is overwritten with the image acquired by the backward shooting section 1b. Also, the image synthesis section 7 does not only switch two images, but also has a function to display two images placed on the same screen At this time, it is also possible to display an image for which shake has been determined by shake determination section 3 in a small size.

FIG. 2 is an external perspective view looking from the rear surface, and although not shown the forward shooting section 1a containing a shooting optical system is arranged at a front side of the camera 10, and it becomes possible to acquire movie images forward and backward of the camera 10 at any point in time using the forward shooting section 1a and the backward shooting section 1b. Also, the release button, which is part of the operating section 4, is arranged on an upper surface of the camera 10. It is possible to adopt a zoom lens as the shooting optical system of the forward shooting section 1a, and in that case a zoom switch used for the zoom operation is provided in the operating section 4.

Next, a scene that could not be taken as a still image up to now will be described using FIG. 3. FIG. 3 is one example of a background that is often seen at places of historical interest.

With this type of subject example, if the entire scene is shot, it is not possible to portray detail, as shown in FIG. 3(a). On the other hand, if part of the scene is taken in an attempt to capture detail, it is not possible to capture the overall scene. In the case of this type of subject, in order to record both the overall impression and the detail, it is common practice to take still pictures of both the overall scene as shown in FIG. 3(a) and a detailed section as shown in FIG. 3(b), and further, in order to show that the photographer is at the site, to take a photograph as shown in FIG. 3(c).

However, with only these types of still images, it is difficult to understand the relationship between each photograph, and the strength of overall impression and detail of a scene, and storage of the fact that a place has been visited, is separately depicted. Also, although it is possible to shoot the process from FIG. 3(a) to FIG. 3(b) as a movie, this is quite monotonous and results in an unexciting video, not a video that has a narrative with a properly developed structure. With this embodiment therefore, it is made possible to easily depict the overall scene, details, and the fact that the photographer has been there, in a video.

Figure 4A:
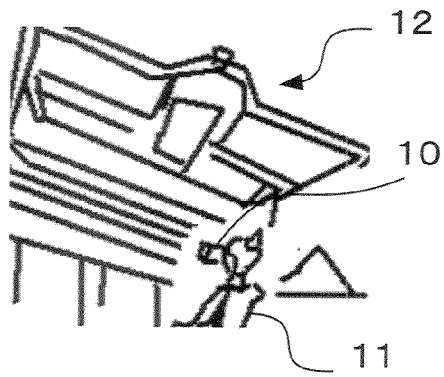
FIG. 4A and FIG. 4B are drawings showing appearance when shooting a subject, in a first embodiment of the present embodiment, and in more detail
Figure 4B:
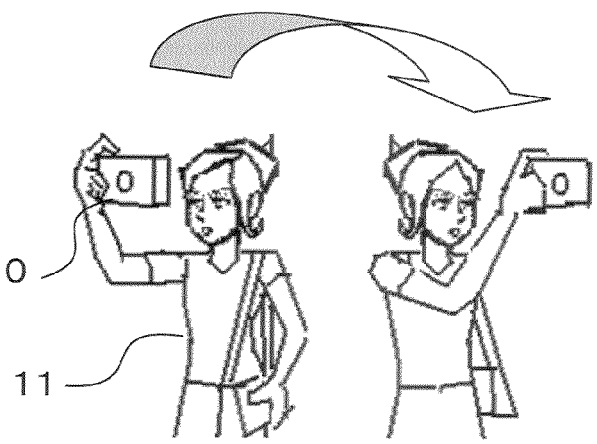
Figure 5A:
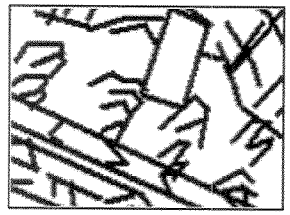
FIG. 5A and FIG. 5B are drawings showing appearance of a detailed section of a building, that is a subject, in the first embodiment of the present invention.
Figure 5B:

If a user 11 of the camera 10 gets close to a large building 12, there is generally significant movement of the camera in order to capture al the details. Specifically, the photographer 11 will start shooting in front of the large building 12, as shown in FIG. 4A. In this case, when shooting a building having detailed exquisite workmanship, such as shrines and temples shown in FIG. 4B, the photographer 11 shoots from corner to corner of the detailed area while carrying out a panning operation, moving the camera a long way, as shown in FIG. 4B.

Figure 6A:
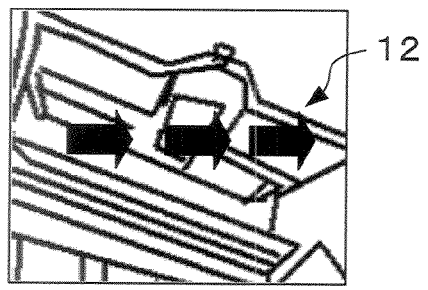
FIG. 6A and FIG. 6B are drawings showing appearance when shooting when panning, in a first embodiment of the present embodiment, and in more detail
Figure 6B:
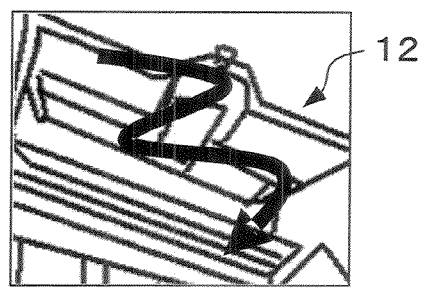

In this case of shooting while panning, if the scene is panned regularly and slowly in the direction of the arrows as shown in FIG. 6A, then when playing back the recorded image it is possible for the viewer to easily see the movie. However, it is quite common when traveling that the intended shooting can not be carried out, and shooting with irregular and unstable movement results, as shown by the arrows in FIG. 6B. If shooting is carried out with this type of irregular and unstable movement, the viewer is likely to suffer from a bad sensation reminiscent of motion sickness. With this embodiment, in order to prevent this type of bad feeling, in the case where acute, irregular, unstable movement is detected, an image that is easiest to see, from a plurality of images that are taken at the same time, is displayed with priority.

Specifically, if a user 11 shoots a video while gradually approaching a building 12, as shown from FIG. 7(a) to FIG. 7(c), then even if the building 12 is large it is possible to depict the overall size. If the building 12 is approached, and if the scene is zoomed in, using a zoom operation, it is possible to depict the detailed sections, as shown in FIG. 7(d).

However, if the camera 10 swings and the camera eye line moves, a poor image results. In particular, at the telephoto side, even with a small variation in direction the field of view is narrow, and so the screen changes significantly. In this embodiment therefore, in a situation such as where viewing is hampered because of shaking, shooting is carried out using the shooting section facing the photographer of the camera 10, as shown in FIG. 1(g), and the image displayed. Once shaking settles down, shooting is carried out again for the building 12 side, as shown in FIG. 7(f).

With this type of shooting, from the entire building 12 to the detailed sections, and further to the photographer 11 doing the shooting, are captured in a sequence of movies. Specifically, while obtaining an intensity and a sense of presence that were impossible to express up to now with still pictures, it has become more possible to shoot a movie with variations, moving along a properly developed narrative structure, such as introduction=the entire building, development=approaching the building, turn=the photographer, and conclusion=detail, thus overcoming the monotony at the time of viewing.

Figure 8:
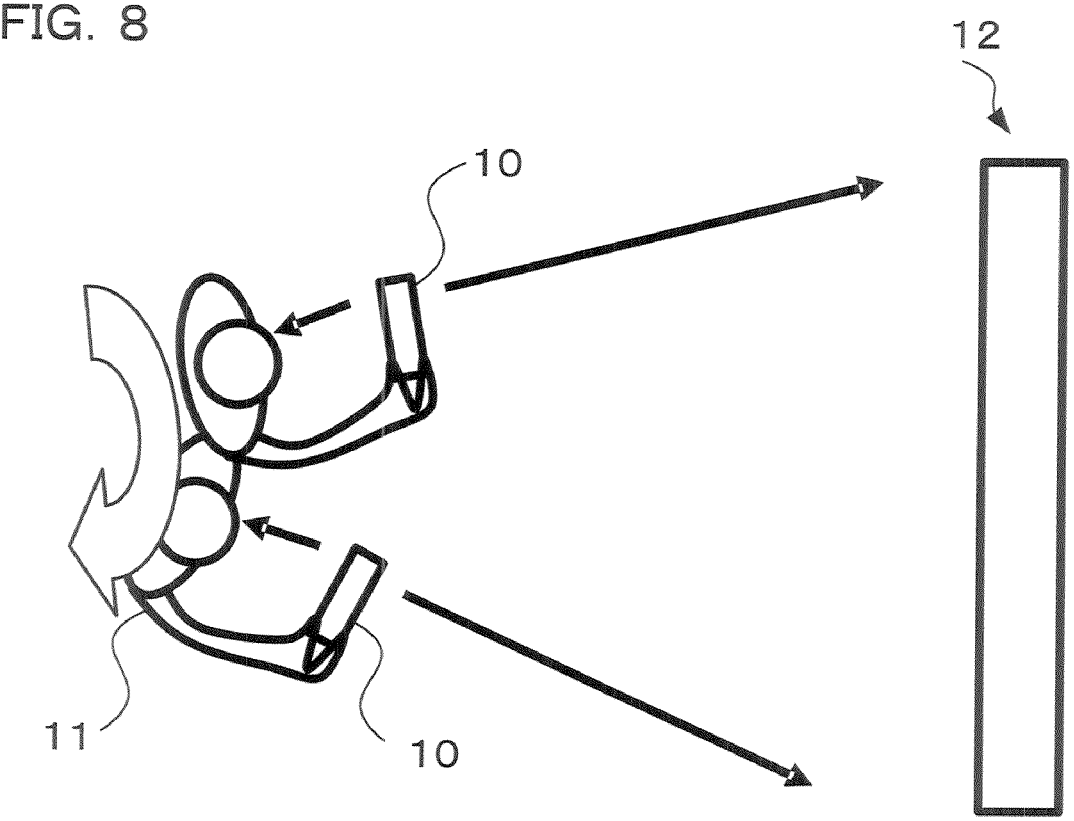
FIG. 8 is a drawing for describing that an image does not become unstable with a rear image not becoming blurred, in the first embodiment of the present invention.

Next, the reason why a photographer side image taken by the backward shooting section 1b has less shake compared to a subject side image taken by the forward shooting section 1a will be described using FIG. 8. The photographer 11 sets up the camera 10, and if they perform panning movement along the arrows while looking at the display section 8, the camera 10 in front of the photographer 11 shoots the building 12 while tracing along the wall surface, changing the part of the building being shot.

In this case, the photographer 11 side has a fixed relationship with the camera 10, and so significant shaking will only arise in the background (that is, the building 12 side). On the other hand, since almost no shaking occurs at the photographer side, in the case of looking at the facial expression of the photographer it appears that there is no shaking. In this way, when shooting a movie with a lot of shaking, it is possible to improve the level of perfection by combining with an image with little shaking (photographer side image).

Next, operation of the camera 10 of the first embodiment will be described using the flowchart shown in FIG. 9. If the processing flow for camera control is entered, it is determined whether or not the camera 10 is set in shooting mode (S1). This camera 10 can be set to either shooting mode or playback mode by the photographer. If the result of determination in step S1 is that shooting mode has been selected, it is then determined whether or not shooting is to be carried out (S2). This determination as to whether or not to perform shooting is carried out by detecting whether or not the release button of the operating section 4 has been pressed down halfway.

If the result of determination in step S2 is that there is no shooting, step S1 is returned to. On the other hand, if the result of determination is that there is to be shooting, anterior shooting and recording are started (S11). In this step, image data for a movie of the subject is acquired in the forward shooting section 1a, and this image data is stored in the image storage control section 2.

It is next determined whether or not image change is irregular, or if the change is large. (S12). This step determines whether the camera is being moved in an unstable manner using a result of determination from the shake determination section 3, namely whether or not the movement of the camera is not a transition in one direction but is irregular movement, or is moving too quickly. If the result of this determination as that image variation is not irregular or that image variation is not extensive, processing returns to step S11, and anterior exposure and the recording thereof continue.

Figure 10:
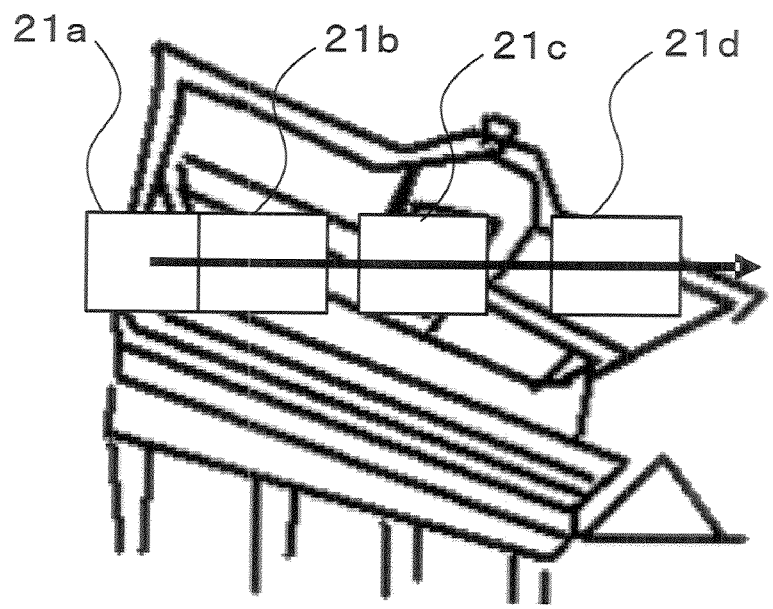
FIG. 10 is a drawing for describing rapid movement, in the first embodiment of the present invention.

Here, the determination as to whether or not the image variation is irregular or extensive in step S12 will be described using FIG. 10 and FIG. 11. A movie is constructed by combining a series of still images, and with the example shown in FIG. 10, images are obtained sequentially from the stopped shooting point 21a through shooting frames 21b-21d. In this case, shooting frame 21b and shooting frame 21c, and shooting frame 21c and shooting frame 21d, do not overlap. Specifically, associated frames are compared from the stopped shooting point, and if a situation where there are no overlapping images continues for one second or longer, for example, it is determined to be unstable movement as the movement is too-fast.

Figure 11:
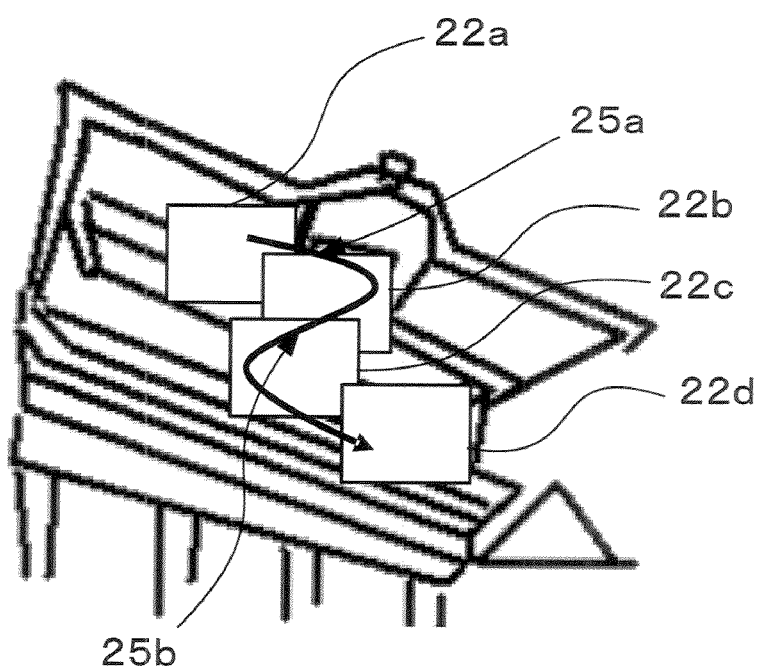
FIG. 11 is a drawing for describing unstable movement, in the first embodiment of the present invention.

Also, in the example shown in FIG. 11, from the stop point 22a there are variations having large undulations at shooting frames 22b, 22c and 22d sequentially. Specifically, if image movement vectors are determined, there is irregular variation in the X direction and the Y direction, and with a locus 25*a* for from the stop point 22*a* to shooting frame 22*b* the X direction variation>the Y direction variation, whereas with the locus 25*b* for from shooting frame 22*b* to shooting frame 22*c* the X direction variation<the Y direction variation. In cases like this, there is unstable movement and unpleasant movement is determined. According to recent research, it has become understood that movement around a longitudinal axis (so called roll motion) has a significant effect on people. For example, refer to the article "Aiming to create viewing environments for films that are viewer friendly" in National Institute of Advanced Industrial Science and Technology TODAY, Vol. 6, No. 3, pages 28-29 (2006). This publication is incorporated by reference. It is also possible to determine unstable movement in cases where this roll motion is detected. Specifically, a video that is rotating about a vertical direction in the video (direction a person's body is erected in), it will be understood that a person watching this video will be made to feel dizzy or travel sick, and this effect becomes significant at rotational speeds approaching 30 to 70 degrees/second. It can also be inferred from this that it is likely that besides rotation, for example, a video moving up and down or from side to side at 5-10 Hz will also cause this bad feeling of travel sickness. Further, it is possible to determine as unstable when there is vibration at an amplitude of 10% of the screen range. However, whether the instability is perceptible is different depending on the screen size at the time of display, and so it is possible to appropriately change the amplitude of vibration at which it is judged to be unstable according to the screen size. Detecting the locus of the image is not limited to the use of motion vectors, and it is also possible to use output of a hand vibration sensor, for example.

If the result of determination in step S12 is that image variation is irregular (refer to FIG. 11) or large (refer to FIG. 10), a rear camera image is stored for a predetermined time (S13). With this step, a movie image is acquired using the backward shooting section 1*b*, and this movie image is stored in the image storage section control 2. Here, storing the image for a predetermined time is because if the image is switched to suddenly it will impart an unnatural feeling to the user, such as the camera 10 seeming to become faulty.

Next, it is determined whether or not there is a shooting completion operation (S14). In this step, it is determined whether or not the release button has been operated again. If the result of this determination is that there is not shooting completion, it is then determined whether or not anterior screen (image) variation is small (S15). At the time of shooting using the backward shooting section 1*b* also, a movie image acquired by the forward shooting section 1*a* is temporarily stored in the supplementary storage section 2*a*. In this step S15, using the temporarily stored front of camera image, it is determined whether or not variation in the forward shooting image has become smaller.

If the result of determination in step S15 is that the variation in the forward image is not small, processing returns to step S13, and shooting and storage of the camera rear image continue. On the other had, if variation of the forward image is small, processing returns to step S11 and the camera forward image is switched to and stored.

If the result of determination in step S14 is that there has been a shooting completion operation, a shooting completion operation is carried out (S17). Specifically, the video shooting operation is terminated. If the shooting operation is completed, a return is executed, and processing is executed again from step S1.

If the result of determination in step S1 is that shooting mode is not in effect, it is playback mode, and in that case it is next determined whether or not selection of a playback image has been performed (S3). In this step, determination is carried out as to whether or not a playback image has been elected from among a plurality of movies, using a playback operation member, not shown, of the operating section 4. If the result of determination is that a playback image has no been selected, a return is executed, and processing is executed again from step S1.

If the result of determination in step S3 is that a playback image has been selected, it is then determined whether or not playback is to be carried out (S4), and if the result of determination is that playback will not be performed, processing returns to step 3 (S3). On the other hand, in the case of playback, playback of the image is carried out (S5). In this step, playback of a video stored in the image storage control section 2 is carried out.

When shooting the video in step S11 to step S17, in the event that image variation is irregular or large, then since a backward image that has little shaking is stored, playback of the image in step S5 does not involve irregular image variation or extensive shaking. Also, since not only the subject but also the photographer are shot together (back of camera shooting) the image resultantly becomes varied and interesting. If the image playback is completed, a return is executed, and processing is executed again from step S1.

In this embodiment, either one of a movie from the forward shooting section 1*a* (front image) and a movie from the backward shooting section 1*b* (rear image) are stored as a moving image. However, it is possible not only to switch the image in its entirety in this way, but also to store composite images arranged within a single screen. Also, although a rear of camera image is stored in step S13, if a front of camera image is also successively stored at this time, then at the time of image playback in step S5 it is also possible to handle cases where it is desired to see the front of camera image.

Next, a second embodiment of the present invention will be described using FIG. 12 to FIG. 14. With the first embodiment of the present invention, at the time of shooting, if there is unstable movement in the image variation, such as irregular movement, or if the image variation is extensive, there is a switch from the forward shooting section 1*a* to the image of the backward shooting section 1*b*, and this image is stored. With the second embodiment, at the time of shooting, images of both the forward shooting section 1*a* and the backward shooting section 1*b* are stored, at the time of playback it is determined whether or not there is unstable movement in the image, and the image to be displayed is then switched based on the result of this determination.

Figure 9:
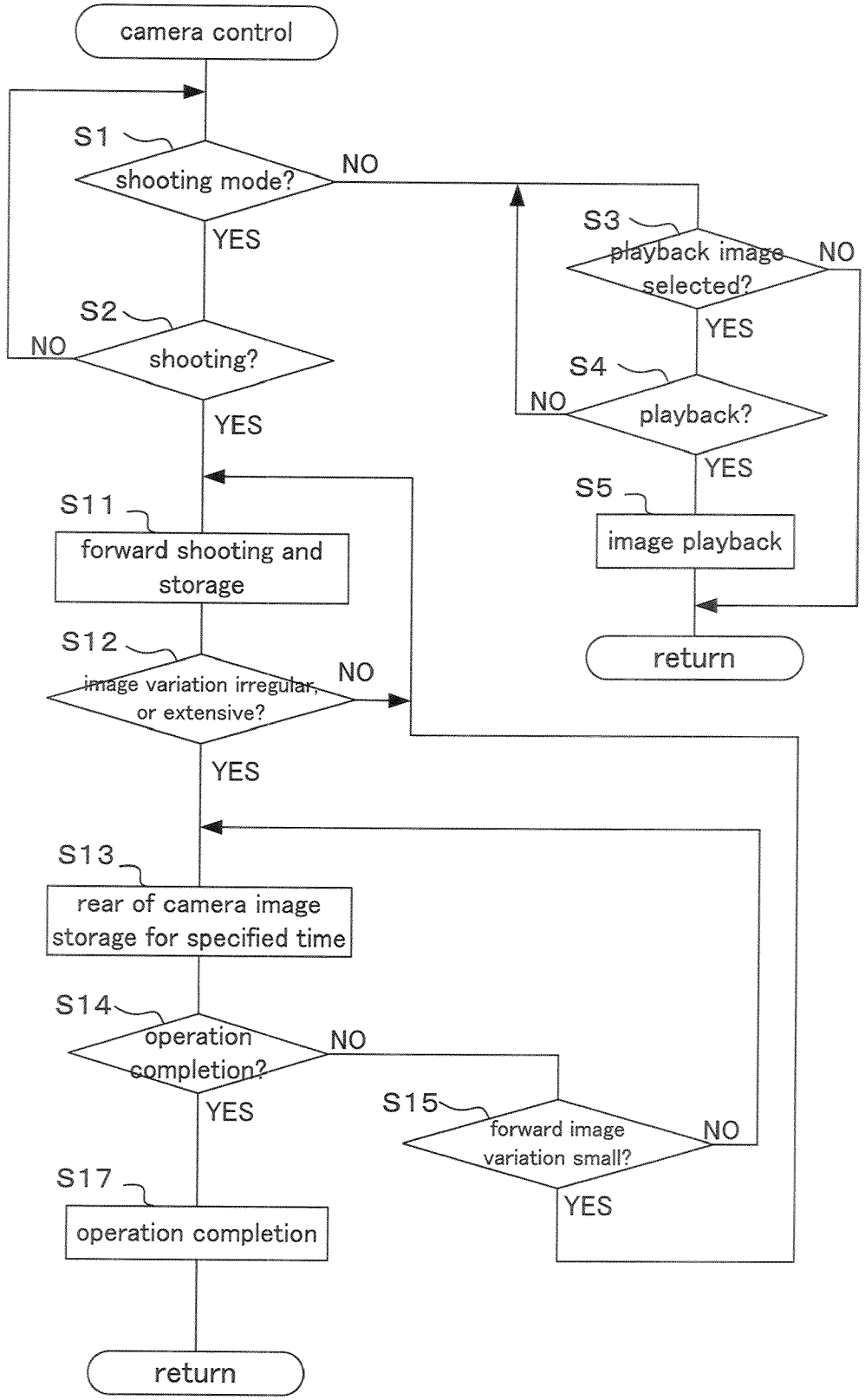
FIG. 9 is a flowchart showing operation for camera control relating to a first embodiment of the present invention.

The structure of the second embodiment is the same as the structure of the first embodiment shown in FIG. 1, and camera control flow shown in FIG. 9 is simply changed to the flowchart shown in FIG. 12, and so description will be given for the different processing flows.

Figure 12:
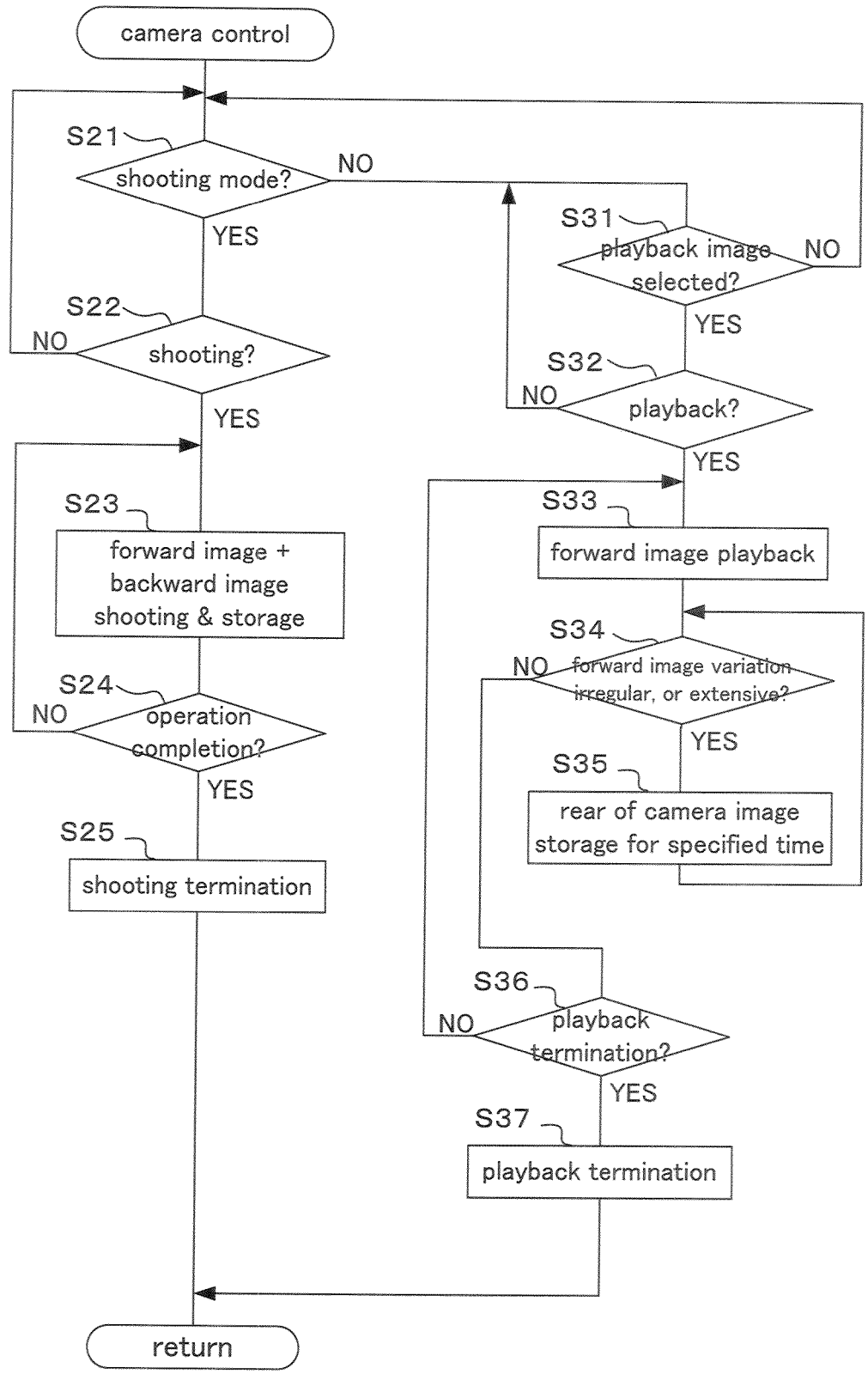
FIG. 12 is a flowchart showing operation for camera control relating to a second embodiment of the present invention.
Figure 13:
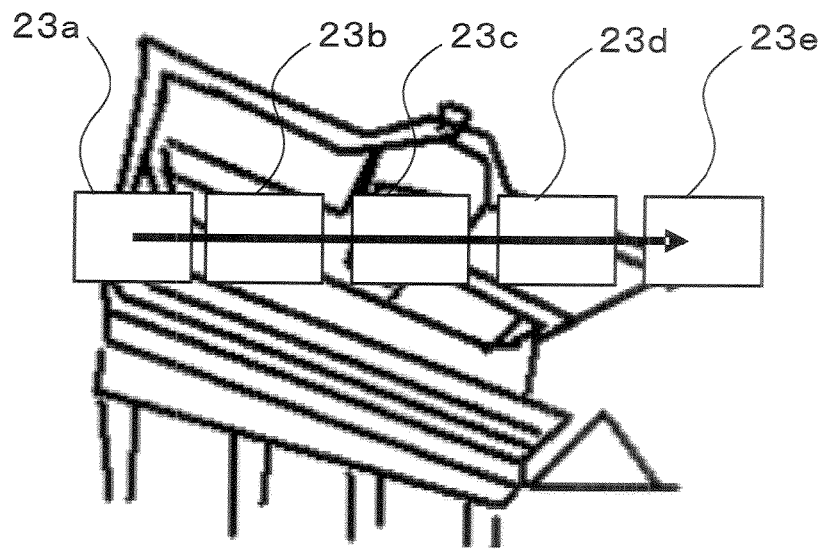
FIG. 13 is a drawing for describing rapid movement, in the second embodiment of the present invention.

If the flow shown in FIG. 12 is entered, then similarly to step S1, it is determined whether or not it is shooting mode (S21). If the result of this determination is that shooting mode has been selected, it is then determined, similarly to step S2, whether or not shooting is to be carried out (S22). If the result of this determination is that shooting is not carried out, processing returns to step S21.

If the result of determination in step S22 is that shooting will be carried out, shooting is carried out to the front and to the rear, and the resulting images are stored (S23). In this step, shooting is carried out with the forward shooting section 1*a* and the backward shooting section 1*b*, and both image data are stored in the image storage control section 2. Then, as in step S14, it is determined whether or not there is operation completion (S24).

If the result of determination in step S24 is that a shooting completion operation has not been carried out, processing returns to step S23, while if there is operation completion, as with step S17, a shooting completion operation is carried out (S25). If the operation completion operation is carried out, a return is executed, and processing is executed again from step S21. In this way, at the time of shooting, front and rear images are simultaneously stored until operation completion is determined in step S24.

If the result of determination in step S21 is that shooting mode has not been selected, it is then determined, similarly to step S3, whether or not a playback image has been selected (S31). If the result of this determination is that an image has not been selected, processing returns to step S21. On the other hand, if an image has been selected, it is then determined, similarly to step S4, whether or not playback will be started (S32). If the result of this determination is that playback is not started, processing returns to step S31.

On the other hand, if the result of determination in step S32 is that playback will be started, playback of a forward image is commenced (S33). As described previously, a forward image and a backward image are both stored in the image storage control section 2, but of these two images the forward image is read out and subjected to playback display on the display section 8.

Next, it is determined whether variation of the forward image is irregular or if variation is extensive (S34). In this step it is determined whether or not the variation in the forward image is irregular movement or variation in speed, such that it has a detrimental effect on viewing appreciation, such as making the viewer feel nauseous.

Determination as to whether or not the stored movie is moving in an unstable manner will be described using FIG. 13 and FIG. 14. As described previously, the movie is made up by combining successive still images. With the example shown in FIG. 13, shooting frames 23*b* to 23*d* are consecutively stored between a first shooting stop point 23*a* when shooting is stopped for one second or longer, and a second shooting stop point 23*e* when shooting is stopped for one second or longer. In this case, shooting frame 21*a* and shooting frame 21*b*, shooting frame 21*b* and shooting frame 21*d*, and shooting frame 21*c* and shooting frame 21*d* etc., do not overlap. Specifically, associated frames are compared from the stopped shooting point, and if a situation where there are no overlapping images continues for one second or longer, for example, it is determined to be undesirable movement which is too fast.

Figure 14:
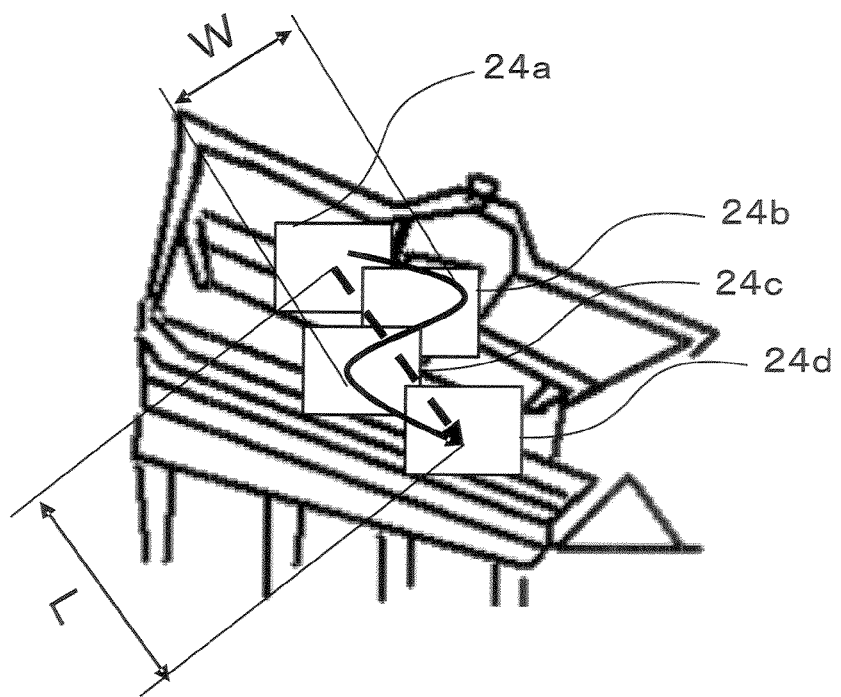
FIG. 14 is a drawing for describing unstable movement, in the second embodiment of the present invention.

Also, in the example shown in FIG. 14, shooting frames 24*b* and 24*c* between the first stop point 24*a*, where shooting has stopped for one second or more, and the second stop point 24*d*, where shooting has stopped for one second or more, are varying with significant undulation. Specifically, movement vectors of the images are determined, and in the event that movement between the first stop point 24*a* and the second stop point 24*d* is not linear, and a width W of the undulation is greater than or equal to half the linear distance L between them, it is determined to be undesirable movement which is unstable. As described previously, an image that moves about a longitudinal axis (so-called roll movement) has a comparatively strong effect on the human body. In a case where the playback image suffers from roll motion, or a case of a video that is moving up and down or to either side, it is also possible to determine as undesirable movement. Also, similarly, when the image oscillates with an amplitude of 10% of the screen range (that is, the percentage can be changed according to the display size) it is possible to determine as unstable.

If the result of determination in step S34 is that variation of the forward image is irregular or extensive, the image taken by the backward shooting section 1*b* and stored in the image storage control section 2 is read out, display is switched to this rear of camera image, and subjected to playback display on the display section 8 (S35) If playback display is carried out, processing returns to step S34, and the previously described operations are carried out.

If the result of determination in step S34 is that image variation of the front image is not irregular, or that variation is not extensive, it is then determined whether or not there is playback completion (S36). If the result of this determination is that there is not playback completion, processing returns to step S23 and the operations described above are executed. On the other hand, if there is playback completion, the playback operation is terminated (S37) and a return is executed. Once the return has been executed, processing from step S21 is executed again.

In this way, with the second embodiment of the present invention, at the time of shooting both a forward image and a backward image are stored simultaneously, and at the time of playback the front image is first subjected to playback display, and at this time variation in the front image is judged, and in the case where unstable operation has been carried out the rear image is switched to and playback display is performed with this rear image. As a result, since display is carried out by switching between images to the front and to the rear, an image having variation results, and it is possible to prevent the viewer suffering discomfort due to unstable movement.

With this embodiment, images are automatically switched in the case of unstable movement, but in this type of situation, and also in cases where it is desired to see a front image, it is also possible to manually return to the front image.

Next, a third embodiment of the present invention will be described using FIG. 15 and FIG. 16. This third embodiment switches to a rear image only in the case where there is extensive panning, since if the front image and rear image (image of the photographer) are switched frequently it is not possible to view the image in a relaxed manner.

Specifically, when depicting the appearance looking at the whole of the building 12 or from close to the building, then as shown in FIG. 7(*a*) and FIG. 7(*b*) after shooting from far away to close in, if shooting looking backwards is carried out so as to show that the photographer was at the site themselves, it becomes possible to record the fact that the place was visited, thus giving final confirmation of the relationship between the building 12 and the photographer.

Figure 15:
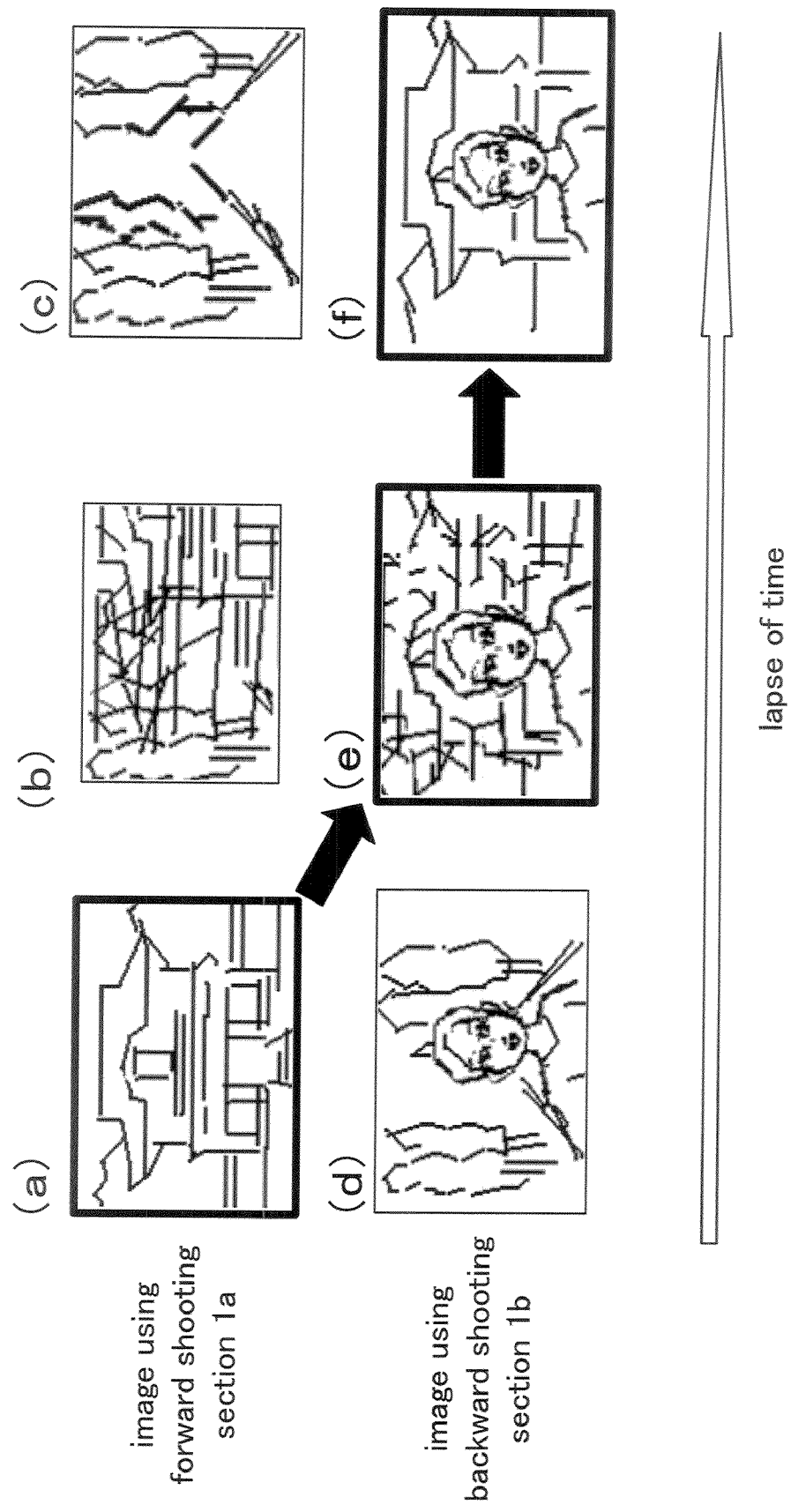
FIG. 15 is drawings showing appearance of shooting a building, which is a subject, in the second embodiment of the present invention.
Figure 16:
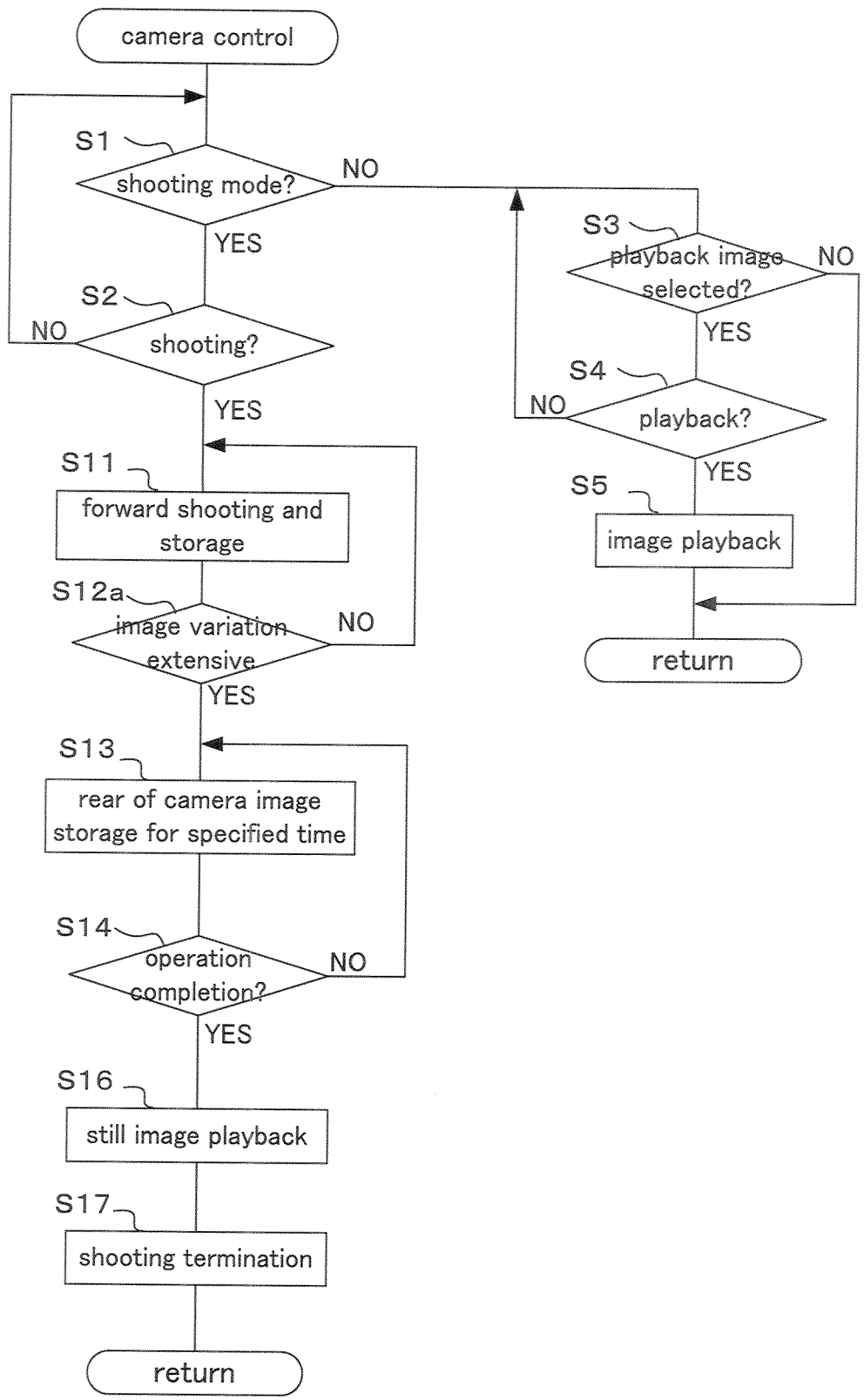
FIG. 16 is a flowchart showing operation for camera control relating to a third embodiment of the present invention.

In cases of performing this type of shooting, a frontal image (image from the forward shooting section 1*a*) changes as in FIG. 15 (*a*)→(*b*)→(*c*). On the other hand, a rear image (image from the backward shooting section 1*b*) changes as in FIG. 15 (*d*)→(*e*)→(*f*). Here, (a) and (b) of FIG. 15 are at the same time, and similarly (b) and (e), and also (c) and (f), are at the same time.

In this case, the forward image at the time of (a) and (d), and FIG. 15(*e*), which is a photographer image, is selected if the forward image is panned at the time of operation of looking backwards and there is a large amount of image variation, and shooting continues with the rear image (FIG. 15(*f*)), and if still picture shooting is finally carried out it is possible to leave a shooting result such that it appears that the photographer is standing in front of a background that was shot in FIG. 15(*a*).

If the movie shooting as in this embodiment is carried out, unpleasant taken images are not played back, and by also shooting an image for and "ending scene", indicating that the user has arrived at that place, it is possible to prevent apparently dislocated shooting.

The structure of the third embodiment of the present invention is the same as the structure of the first embodiment shown in FIG. 1, and camera control flow shown in FIG. 9 is simply changed to the flowchart shown in FIG. 16, and so description will be given for the different processing flows. In steps for carrying out processing that is the same as that of the flow in FIG. 9, the same reference numerals are used, and detailed description is omitted.

Differences from the flow of FIG. 9 are simply that step S12 is replaced with step S12a, step S16 is added, and step S15 is omitted. In step S12a, after commencing from image shooting and storage, it is determined whether or not variation in the front image is extensive (S12a). In the first and second embodiments it was also determined whether or not the front image varies irregularly, but in the third embodiment it is only determined whether or not the front image varies extensively. This is so as not to switch the front image and the rear image (image of the photographer) frequently, and so as to switch to the rear image when the photographer performs a panning operation. For this reason step S15 of FIG. 9 is omitted.

Also, when it has been determined in step S14 that a shooting completion operation has been carried out, still picture shooting is carried out before executing the shooting completion operation (S16). By carrying out still picture shooting it is possible to enjoy still pictures as well as movies. It is also possible to use a still image as an exemplary image for when searching from among many videos, and if displayed when performing thumbnail display it is useful at the time of retrieval.

In this way, with the third embodiment of the present invention, it is possible to prevent frequent switching of the front image and the rear image when the photographer 11 shoots with irregular movement, and it is possible to view images in a relaxed way.

In this manner, with the first to third embodiments of the present invention, it is determined whether or not a movement pattern of a forward image is unstable, and if it is unstable a backward image is switched to. Therefore, when performing storage and playback of a movie, it is possible to shoot with variation so that it does not become tedious. Also, if a movie being shot, disturbance of the movie, due to the camera moving, which is inevitable, is alleviated by complementing with an image that is not disordered, and so it becomes possible for even a non-professional to shoot a movie that is easy to watch.

Also, with the first to third embodiments of the present invention, switching of the forward image and the backward image is done either when shooting or when playing back. By switching images at the time of shooting, it is possible to reduce the capacity of the storage medium for storing the movie (refer to the first embodiment). Also, in the case of switching images at the time of playback it is also possible to enjoy images in a direction other than that which is automatically switched, in accordance with the wishes of the viewer, and there is no need to worry about control delay for switching at the time of shooting (second embodiment).

Next, a fourth embodiment of the present invention will be described using FIG. 17 to FIG. 25. In the first to third embodiments, there were imaging sections for respectively imaging in the forward and backward directions of the camera 10, and images were switched if an image was unstable. With this embodiment, there are respective imaging sections for wide-angle and telephoto, and they are switched if an image becomes unstable.

The camera of the fourth embodiment of the present invention has two shooting sections, namely a wide-angle shooting section for shooting at wide angle, and a telephoto shooting section for shooting at telephoto, in order to acquire movies. Acquisition of image data for a movie is commenced in response to operation of a release button, and acquired data is recorded in a storage medium. Also, the camera of the fourth embodiment prevents taking of unappealing scenes, in cases where an image has been ruined due to unstable framing, such as hand shake or panning, by switching from an image of the telephoto shooting section to an image of the wide-angle shooting section.

Figure 17:
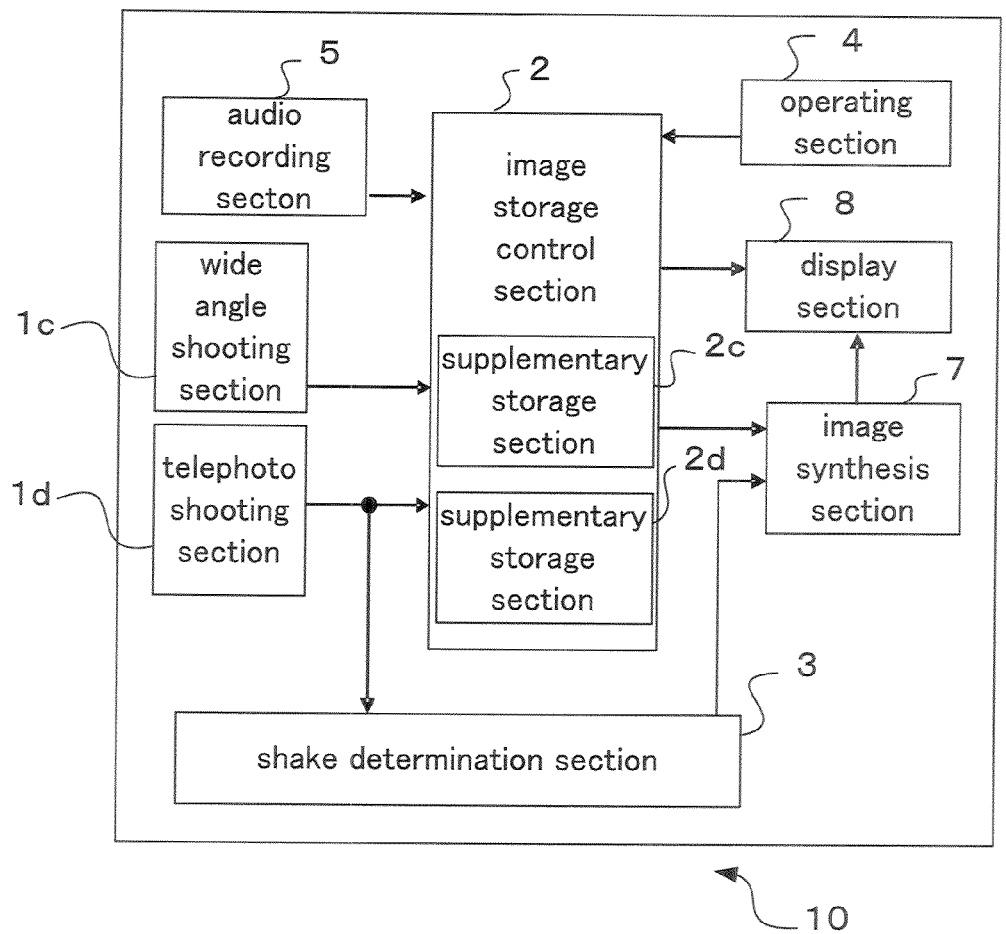
FIG. 17 is a block diagram showing the structure of a camera relating to a fourth embodiment of the present invention.

FIG. 17 is a block diagram showing the structure of a camera relating to the fourth embodiment of the present invention, and the camera 10 is a digital camera for shooting a subject and acquiring images. The camera 10 comprises a wide-angle shooting section 1c, a telephoto shooting section 1d, an image recording control section 2, a shake determining section 3, an operating section 4, an audio recording section 5, an image synthesis section 7 and a display section 8.

The wide-angle shooting section 1c shoots the entire subject at a focal distance towards the wide-angle side, and outputs image data for a movie, while the telephoto shooting section 1d shoots detailed sections of the subject at a focal length towards the telephoto side and outputs image days for a movie. Switching of the wide-angle shooting section 1c and the telephoto shooting section 1d is carried out, as shown in FIG. 18A, by arranging an image sensor 6 in the vicinity of the focal point imaging plane of the lens 9, and changing the effective range of the image sensor 6.

Specifically, at the time of shooting using the wide-angle shooting section 1c, subject shooting is carried out at a wide angle side focal length by using the entire area of the image sensor 6. On the other hand, at the time of shooting using the telephoto shooting section 1d, subject shooting is carried out with a telephoto side focal length by using a part within the imaging area of the image sensor 6. In this embodiment, when carrying out shooting with the effective range narrowed, if there is a lot of hand shake control is performed to switch to wide-angle shooting where the effective range is wider.

Figure 18A:
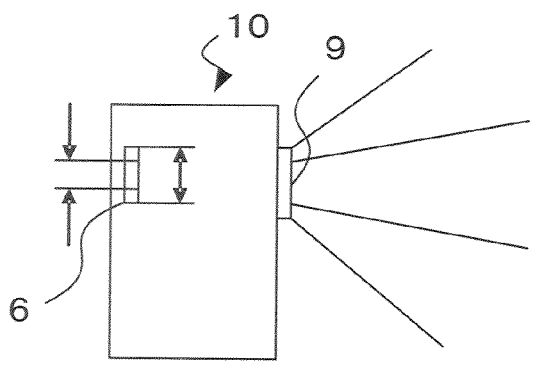
FIG. 18A and FIG. 18B are side views of a wide-angle shooting section and a telephoto shooting section of the camera of the fourth embodiment of the present invention, and in detail
Figure 18B:
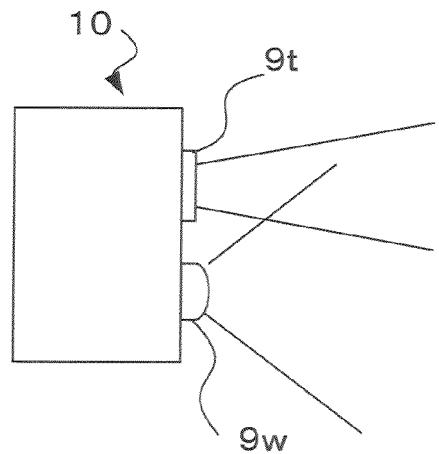

Also, FIG. 18B shows another example of the wide-angle shooting section 1c and the telephoto shooting section 1d, with the telephoto lens 9t and the wide angle lens 9w being arranged at the front of the body of the camera 10. Respective image sensors are arranged in the vicinity of the focal point imaging planes of the wide angle lens 9w and the telephoto lens 9t. Image data for movies are output from these image sensors.

In this embodiment, it is possible to construct the wide-angle shooting section 1c and the telephoto shooting section 1d by adopting either of the configurations of FIG. 18A or FIG. 18B. Also, the imaging optical systems of the shooting sections 1c and 1d can adopt a zoom lens, but in this embodiment a fixed focal length imaging optical system is adopted, and an electronic zoom system for varying the focal length by varying the effective range of the image sensor is adopted. The way in which the effective range of the image sensor is varied can be appropriately selected from various methods, such as varying the range of reading image signals from the image sensor, or cropping image data for an effective range from within image data that has been read from the image sensor.

The image recording control section 2 performs overall control of the camera 10, and performs control for storing image data of a movie output from the wide-angle shooting section 1c and the telephoto shooting section 1d. The image recording control section also has a supplementary storage section 2c for temporarily storing image data output from the wide-angle shooting section 1c, and a supplementary storage section 2d for temporarily storing image data output from the telephoto shooting section 1d. In this embodiment, wide angle movie data and telephoto movie data are selectively stored as movie images, but when storing movie images they are respectively temporarily stored in the supplementary storage sections 2c and 2d.

The shake determination section 3 determines whether or not the camera 10 is carrying out unstable movement, such as hand shake applied to the camera 10 or a panning operation by the photographer. Specifically, this shake determination section 3 is input with image data from the telephoto shooting section 1d, and determines whether or not unstable movement is happening, such as whether the image is changing irregularly, from changes in the image data. Besides analyzing image data, it is also possible to provide a sensor such as an acceleration sensor, angular acceleration sensor, gyro etc., and to carry out the determination based on output from this sensor. It is also possible to carry out well-known shake reduction processing based on output of the shake determination section 3.

The operating section 4 has operating members such as a release button and a zoom button provided on the camera 10. If the release button is operated, the camera 10 commences a movie shooting operation, and if the release button is operated again the movie shooting is stopped. The zoom button has a telephoto side zoom operation member and a wide-angle side zoom operation member, and zooming is carried out in accordance with operation of these operation members. The operating state of the operating section 4 is conveyed to the image recording control section 2. The audio recording section 5 has a microphone, and records ambient sounds at the time of shooting.

The display section 8 includes a display device such as a liquid crystal monitor arranged on the rear surface or the like of the camera 10, and performs playback display of a movie stored in the image storage control section 2. Also, a movie acquired by the wide-angle shooting section 1c or the telephoto shooting section 1d is presented in so-called live view display for viewing the subject image.

The image synthesis section 7 combines an image acquired by the wide-angle shooting section 1c and an image acquired by the telephoto shooting section 1d. A combined image generated by this image synthesis section 7 is displayed on the display section 8. The previously described supplementary storage sections 2c and 2d are temporary storage sections for image synthesis using image data acquired by each of the shooting sections.

The image synthesis by the image synthesis section 7 involves receiving input of determination results of the shake determination section 3 and performing image switching based on shake output. As will be described later, in this embodiment, a movie acquired by the telephoto shooting section 1d is stored, but if a shake state is detected by the shake determination section 3 the image acquired by the telephoto shooting section 1d is overwritten with the image acquired by the wide-angle shooting section 1c. Also, the image synthesis section 7 does not only switch two images, but also has a function to display two images placed on the same screen At this time, it is also possible to display an image, for which shake has been determined by the shake determination section 3, small.

Next, operation of this embodiment will be described, but first description will be given for a scene that could not have been taken as a still image up to now, using FIG. 19. Generally, when shooting large buildings, such as historic temples, shooting is first carried out so as to get as much of the entire building in the shot as possible, as shown in FIG. 19(a). However, clear rendition of detailed sections is not captured in the shot, and so detailed sections are captured by shooting part of the building, as shown in FIG. 19(b). Specifically, in order to record both the overall impact and the detailed sections, two still images were taken, but this made it very difficult to understand the relationship between the two images.

This problem can be overcome by shooting a movie of the transition of FIG. 19(a) to FIG. 19(b). In order to shoot the detailed sections, framing is performed at a telephoto side, but if there is slow measured movement at this time the viewer can also see the movie in a relaxed manner, but it is often the case, when traveling, that it is not possible to capture the intend scenes, and if the screen is moved about hurriedly it will tend to result in an image that is disordered and difficult to watch, as shown in FIG. 19(c). In particular, with shooting at a telephoto side, since the viewing angle is narrow, even a small movement results in a large variation.

With this type of movie the viewer is likely to be made to feel travel sick, and so there is a demand for shooting that eliminates scenes with unpleasant variations. With this embodiment, in the event that an unstable movie is detected, an image that is being shot at the same time and is easier to see is displayed with priority, and stored. Specifically, instead of shooting at the telephoto end as shown in FIG. 18(c), shooting is carried out at the wide-angle end as shown in FIG. 19(e).

In the case where shooting is carried out by switching to the wide angle end as shown in FIG. 19(e) also, when unstable movement no longer appears, the original shooting is returned to, as shown in FIG. 19(d). By switching the angle of view according to shaking conditions in this way, it is possible to depict the overall subject and detailed sections of the subject, and it is also possible to prevent disturbance in the taken image.

Figures 20A, 20B:
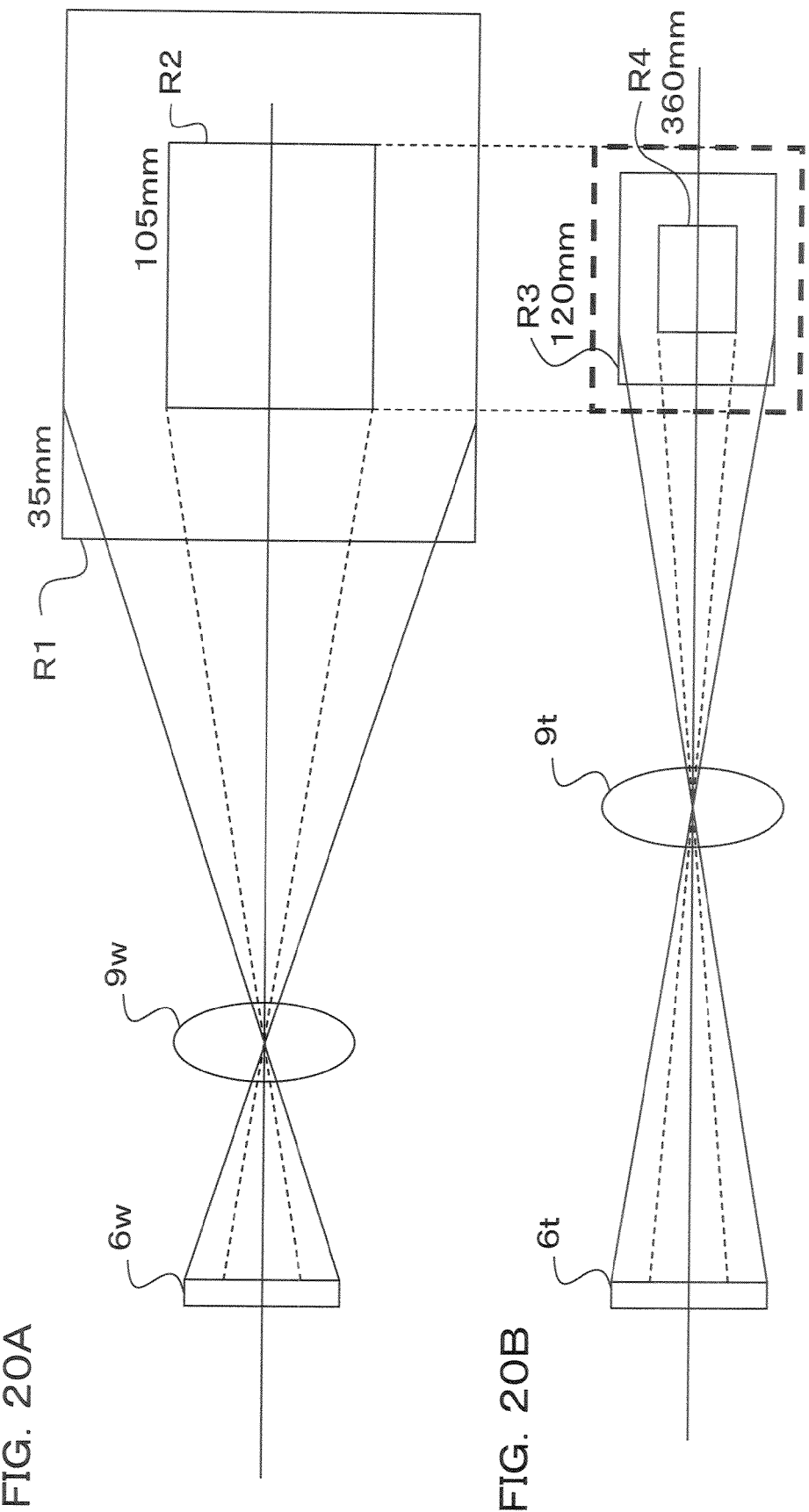
FIG. 20A and FIG. 20B are drawings showing the structure of the wide angle and telephoto shooting sections of the fourth embodiment, and in more detail

Next, switching of the angle of view in this embodiment will be described using FIG. 20. FIG. 20 is a camera having two photographing lenses, namely the wide angle lens 9w and the telephoto lens t9 shown in FIG. 18B. As shown in FIG. 20A, an image sensor 6w is arranged in the vicinity of the imaging plane of the wide angle lens 9w. This image sensor 6w is a solid-state image sensor such as a CCD or CMOS having 9 million pixels. Similarly, as shown in FIG. 20B, an image sensor 6t is arranged in the vicinity of the imaging plane of the telephoto lens 9t. This image sensor 6t is also a solid-state image sensor such as a CCD or CMOS having 9 million pixels.

On the image sensor 6w, a shooting range R1 is the entire viewing angle of the image sensor 6, while a shooting range R2 is that shown as a part controlled to ⅓ within the entire range of the image sensor 6w. This limits the viewing angle to a third, and corresponds to a width variation for 3× zoom. Specifically, if this photographing lens 9w is made a 35 mm photo lens equivalent, it is possible to achieve electronic zoom up to 105 mm, which is three times that. If the image sensor 6w is made a sensor with 9 million pixels, then when using the electronic zoom in the rage of R2, it is controlled to $⅑^{th}$, and so the effective range becomes 1 million pixels.

Also, with the image sensor 6t, the telephoto lens t9 is set such that a shooting range R3 that uses the entire region of the image sensor 6t is a narrower range than the previously described shooting range R2. However, regarding narrowness of the shooting range, if the shooting range R2 is equivalent to 105 mm, the shooting range R3 is made equivalent to about 120 mm.

Similarly to the image sensor 6*w* shown in FIG. 20A, in the case of the image sensor 6*t* shown in FIG. 20B also, if the shooting range is made narrow, it is possible to cover electronic zooming from 120 mm equivalent to 360 mm, or three times, equivalent. Accordingly, by combining the image sensors 6*w* and 6*t*, and the wide angle lens 9*w* and the telephoto lens 9*t*, it is possible to cover from 35 mm to 360 mm, making it possible to have a digital zoom of 10 times. Many video cameras currently on the market are fitted with a 10× zoom, but with the camera 10 of this embodiment it is possible to obtain the effects of a 10× zoom with two fixed lenses (the wide angle lens 9*w* and the telephoto lens 9*t*).

If R2=R3, the shooting range R3 becomes equivalent to 105 mm, and the shooting range R4 becomes equivalent to 315 mm. Specifically, the focal length at the telephoto end is equivalent to 315 mm, and so does not give a 10× zoom.

With this embodiment, as described previously, the wide angle lens 9*w* and the telephoto lens 9*t* are made fixed focal length lenses. In the case of fixed focal length lenses, there is no drive sound generated at the time of driving, as there is with zooming that is driven mechanically, and as a result it is possible to improve sound quality at the time of audio recording. Electronic zooming cannot be adopted between the shooting range R2 and the shooting range R3, but there is only about 10% difference between 105 mm and 120 mm, and it is sufficient to deal with a focal length of either 105 mm or 120 mm, and this difference is negligible.

Figure 21A:
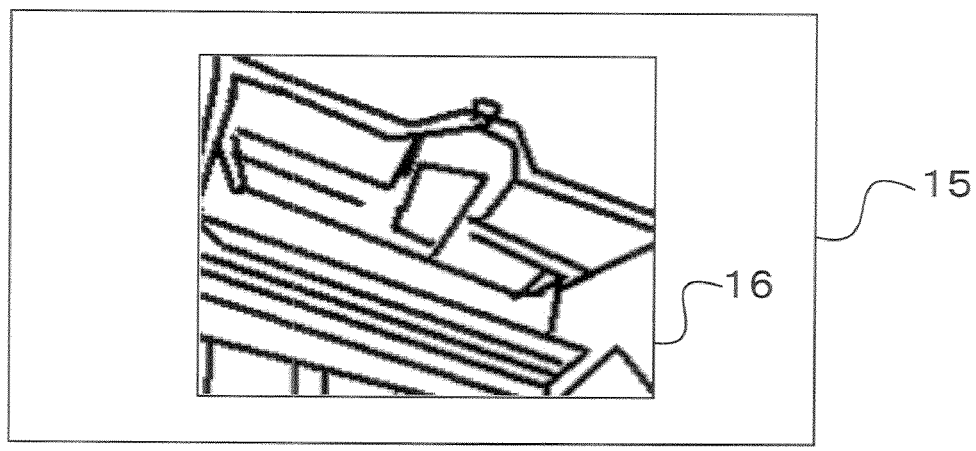
FIG. 21A and FIG. 21B are drawings showing appearance performing playback display if a taken image on a television screen, in the fourth embodiment of the present invention.
Figure 21B:
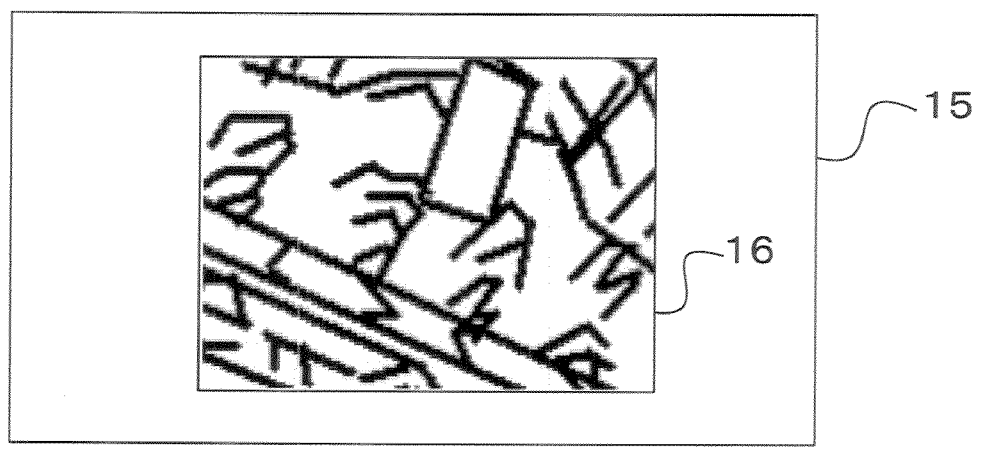

With this embodiment, in determining effective range, the fact that the lowest pixel number is 1 million is because it is a value taking into consideration resolution when performing playback display with high definition television. Specifically, with high definition television there are 1920×1080 pixels, and this is equivalent to about 2 million pixels. As shown in FIG. 21A and FIG. 21B, in cases such as when an imaging plane 16 is only arranged at the center of a television screen 15, with the left and right of the screen 15 being empty, or where two screens are arranged on the television screen 15 (refer to FIG. 25B), the fact that a resolution of 1 million is possible, which is half that of the high definition television, is taken into consideration. In the event that the image sensors 6*w* and 6*t* have 9 million pixels, it is possible to utilize only ⅑ of the total surface area.

Figure 22A:
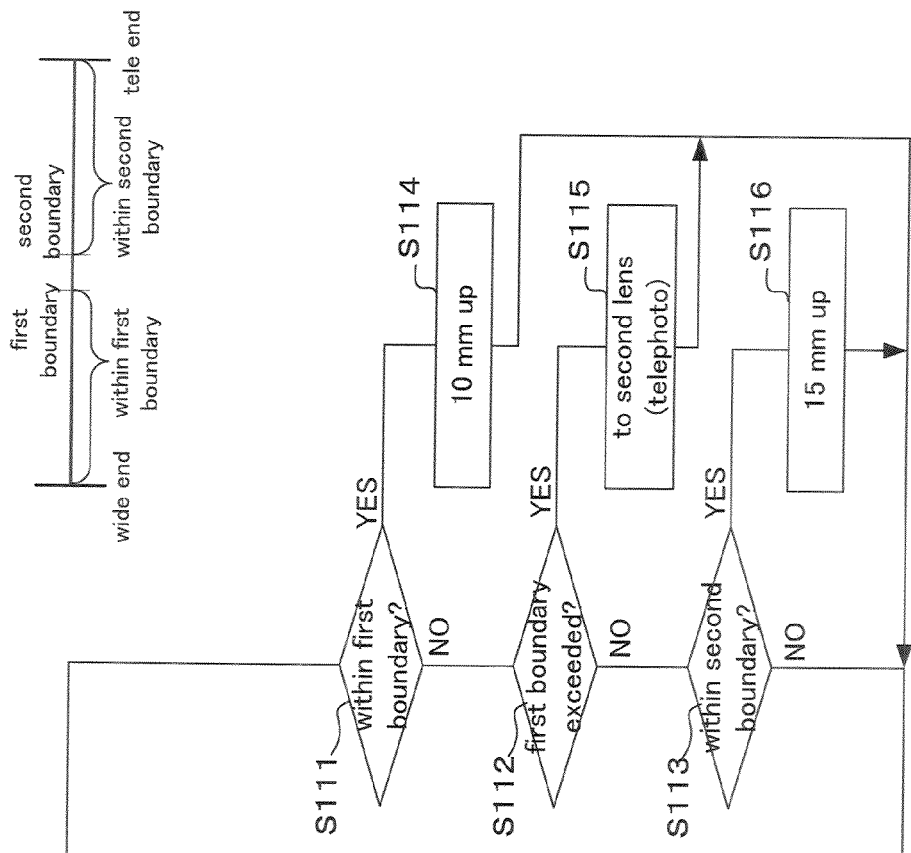
FIGS. 22A and 22B are drawings for describing operation for switching of angle of view in the fourth embodiment of the present invention, and in more detail

Next, lens viewing angle control for a zoom camera as shown in FIG. 20 will be described using the flowchart shown in FIG. 22A. If the processing flow for viewing angle switching is entered, it is first determined whether or not the lens is at the telephoto end (S101). In this step, determination as to whether or not the telephoto side zoom operating member of the operating section 4 has been operated is carried out.

Figure 22B:
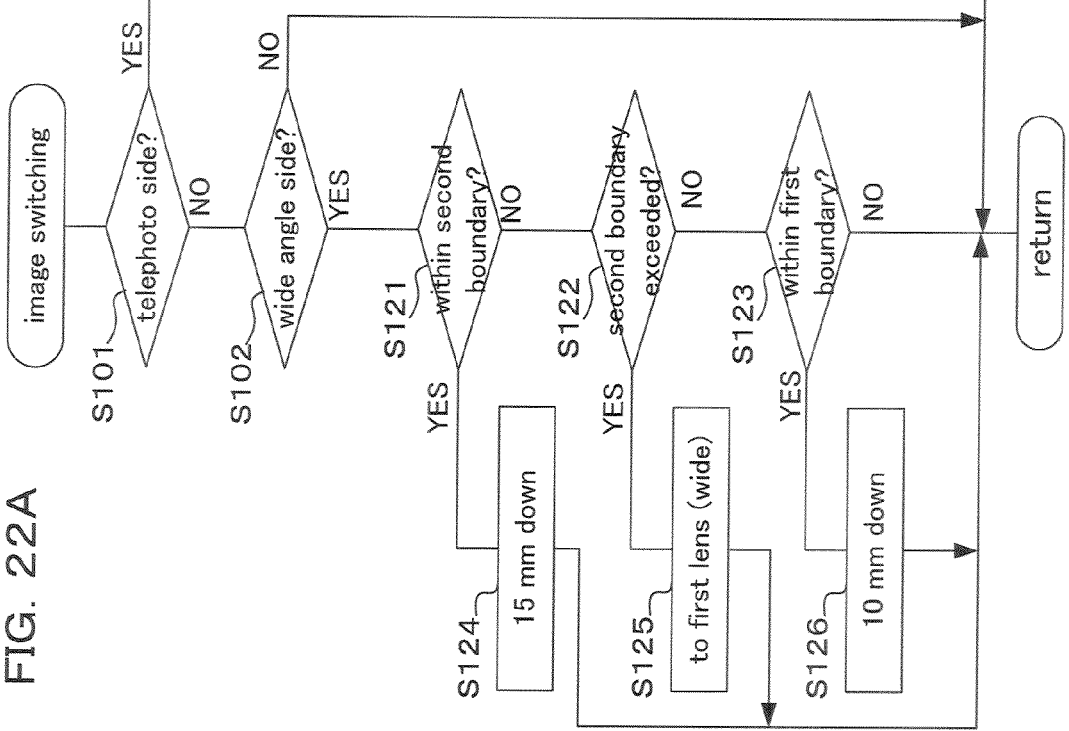

If the result of determination in step S101 is that there has been an operation to the telephoto side, it is next determined whether or not it is within a first boundary (S111). In this step, focal length with an electronic zoom that is currently set by a focal length setting section, not shown, is detected, and it is determined if that focal length is within the first boundary. Within the first boundary is between a wide angle end and the first boundary (105 mm with the example shown in FIG. 20), as shown in FIG. 22B.

If the result of determination in step S111 is within the first boundary the focal length is increased in a pseudo manner by 10 mm (S114). In this step, the effective range of the image sensor 6*w* on which the subject image is formed by the wide angle lens 9*w* is gradually controlled, in increments of 10 mm focal length, to the telephoto side. Once the focal length is increased by 10 mm the original processing flow is returned to.

If the result of determination in step S111 is not within the first boundary, it is next determined whether or not it is beyond the first boundary (S112). In this step, focal length with the electronic zoom currently set by the focal length setting section, not shown, is detected, and it is determined whether or not it is a focal length at the telephoto side beyond the first boundary (105 mm with the example shown in FIG. 10), If the result of determination in step S112 is that the first boundary has been exceeded, there is transfer to the second lens (telephoto) (S115). Specifically, since there is a telephoto side focal length exceeding the first boundary, processing is carried out using image data from the image sensor 6*t* on which an image is formed by the telephoto lens 9*t*. Immediately before the first boundary is exceeded, there is an exposure range R2 (refer to FIG. 20A), and if the first boundary being exceeded is determined it becomes the exposure range R3 (refer to FIG. 20B). Accordingly, with this embodiment the focal length s changed from 105 mm to 120 mm. Once the second lens (telephoto lens 9*t*) has been changed to, the original processing flow is returned to.

If the result of determination in step S112 is that the first boundary has not been exceeded, that is, if there is no changing point from the first boundary to a second boundary (120 mm in the example shown in FIG. 20), it is next determined whether or not it is less than or equal to the second boundary (S113). Within the second boundary is equivalent to the focal length between the second boundary and the telephoto end, and the determination is carried out by detecting focal length with the electronic zoom currently set by the focal point setting section, not shown. The second boundary is between a telephoto end and the second boundary (120 mm with the example shown in FIG. 20), as shown in FIG. 22B.

If the result of determination in step S113 is less than or equal to the second boundary, the focal length is increased in a pseudo manner by 15 mm (S116). In this step, the effective range of the image sensor 6*t* on which the subject image is formed by the telephoto lens 9*t* is gradually controlled, in increments of 15 mm focal length, to telephoto. Once the focal length is increased by 15 mm the original processing flow is returned to.

If the result of determination in step S113 is that it is not less than or equal to the second boundary, the original processing flow is returned to.

If the result of determination in step S101 is that there has not been an operation to the telephoto side, it is next determined whether or not there has been a zooming operation to the wide angle side (S102). In this step, determination as to whether or not the wide angle side zoom operating member of the operating section 4 has been operated is carried out. If the result of this determination is that there was no operation to the wide angle side either, it means there was no zooming operation in any direction, and so the original processing flow is returned to.

If the result of determination in step S102 is that there has been an operation to the wide angle side, it is next determined whether or not it is less than or equal to the second boundary (S121). In this step, focal length with an electronic zoom that is currently set by a focal length setting section, not shown, is detected, and it is determined whether or not that focal length is less than or equal to the second boundary.

If the result of determination in step S121 is less than or equal to the second boundary, the focal length is decreased in a pseudo manner by 15 mm (S124). In this step, the effective range of the image sensor 6*t* on which the subject image is formed by the telephoto lens 9*t* is gradually controlled, in increments of 15 mm focal length, to make the viewing angle wide angle. Once the focal length is decreased by 15 mm the original processing flow is returned to.

If the result of determination in step S121 is not within the second boundary, it is next determined whether or the second boundary is exceeded (S122). In this step, focal length with the electronic zoom currently set by the focal length setting section, not shown, is detected, and it is determined whether or not it is a focal length at the telephoto side exceeding the second boundary (120 mm with the example shown in FIG. 20).

If the result of determination in step S122 is that the second boundary has been exceeded, there is transfer to the first lens (wide) (S125). Specifically, since there is a wide angle side focal length exceeding the second boundary processing is carried out using image data from the image sensor 6w on which an image is formed by the wide angle lens 9w. Immediately before the second boundary is exceeded, there is an exposure range R3 (refer to FIG. 20B), and if the second boundary being exceeded is determined it becomes the exposure range R2 (refer to FIG. 20A). Accordingly, with this embodiment the focal length is changed from 120 mm to 105 mm. Once the first lens (wide angle lens 9w) has been changed to, the original processing flow is returned to.

If the result of determination in step S123 is less than or equal to the first boundary, the focal length is decreased in a pseudo manner by 10 mm (S126). In this step, the effective range of the image sensor 6w on which the subject image is formed by the wide angle lens 9w is gradually controlled, in increments of 10 mm focal length, to be made wide angle. Once the focal length is decreased by 10 mm the original processing flow is returned to.

If the result of determination in step S123 is that it is not less than or equal to the first boundary, the original processing flow is returned to.

In this way, with the fourth embodiment of the present invention it becomes possible to control angle of view in a range of about 10× zoom under the user's control. Also, with this embodiment, the focal length is increased or decreased in 10 mm or 15 mm steps (S114, S126, S116, S124). Specifically, with this embodiment the focal length is not changed continuously, but is changed to discrete focal lengths in a stepwise manner. As a result, there is no sense of discomfort even if there is a gap in the change in the focal length between the first boundary and the second boundary, and it is possible to achieve electronic zoom having a large zoom factor.

Also, within the first boundary, which is the wide angle side, the focal length is changed every 10 mm, while the focal length is changed every 15 mm within the second boundary, which is the telephoto side. This is because the wide angle side generally has a larger change in angle of view compared to the change in the focal length.

With this embodiment, the first boundary is set to 105 mm and the second boundary is set to 120 mm, but this is an example, and it is also possible to change to other focal lengths. Also, the focal length has been changed every 10 mm within the first boundary and every 15 mm within the second boundary, but this is merely an example and it is possible to change to other focal lengths.

Figure 23:
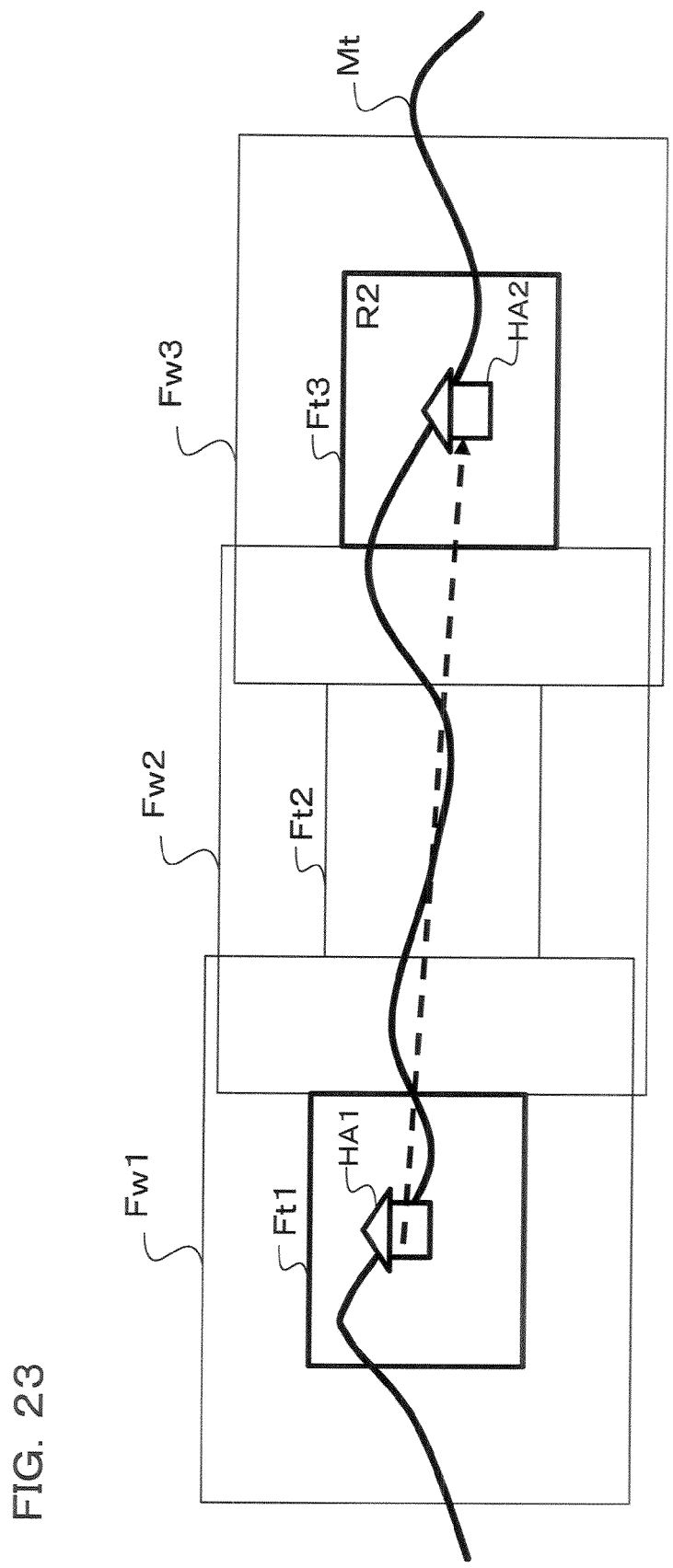
FIG. 23 is drawings showing appearance of shooting a building as a movie, in the fourth embodiment of the present invention.

Next, change in angle of view in this embodiment will be described, using a case where a mountain range, and buildings in the mountain range, are shot as a movie. FIG. 23 shows a landscape with buildings HA1 and HA2 on the ridge line of the mountain range Mt, and shows the appearance when a user is shooting this landscape as a movie going from the left side of the screen to the right side. At this time, the user changes the exposure range in the order of exposure ranges Ft1, Ft2 and Ft3 with the telephoto lens 9t, and shoots from the building H1 to the building H2.

However, if the speed at which the user moves the camera 10 is fast, there is no overlap between exposure ranges Ft1 and Ft2, or between exposure ranges Ft2 and Ft3, and while this is happening the user does not know how the camera 10 is moving, and their eyes will become tired, resulting in discomfort. If the angle of view of the photographing lens is made wider, and shooting is respectively carried out in exposure ranges Fw1, Fw2 and Fw3, there will be overlapping sections, irritation to the eye will be reduced, and the image will be easy to view. In this way, with the example shown in FIG. 23, shooting to give an image that copes with fast movement of the camera and is easy to see can be done better at the wide angle side that the telephoto side.

Next, operation of the camera 10 of the fourth embodiment will be described using the flowchart shown in FIG. 24. In this embodiment, as described using FIG. 23, in the case where unpleasant movement is detected at the time of viewing, due to fast movement of the camera etc., it is possible to shoot an image having reduced unpleasantness by changing the angle of view.

If the processing flow for camera control is entered, it is determined whether or not the camera 10 is set in shooting mode (S41). This camera 10 can be set to either shooting mode or playback mode by the photographer. If the result of determination in step S41 is that shooting mode has been selected, it is then determined whether or not shooting is to be carried out (S42). This determination as to whether or not to perform shooting is carried out by detecting whether or not the release button of the operating section 4 has been pressed. In this embodiment, if the release button is pressed once, movie shooting is commenced, and if the release button is operated again the movie shooting is completed.

If the result of determination in step S42 is that there is no shooting, a viewing angle switching subroutine is executed (S43). This viewing angle switching subroutine is the flowchart described in FIG. 22. In this embodiment, after setting the shooting mode, the viewing angle switching subroutine is executed before commencing the shooting operation, but this is not limiting and it is also possible to execute the viewing angle switching subroutine before shooting mode setting.

On the other hand, if the result of determination in step S41 is that there is to be shooting, movie shooting and recording are started (S51). In this step, a movie shooting operation using the electronic zoom is carried out based on focal length being set. Specifically, image data for a movie of the subject is acquired in the wide-angle shooting section 1c and the telephoto shooting section 1d, and this image data is stored in the image storage control section 2. In addition, ambient sounds are recorded by the audio recording section 5.

Next, it is next determined whether or not image change is large (S52). This step is carried out using a result of determination from the shake determination section 3, and determines whether the camera is being moved in an unstable manner, namely whether or not the movement of the camera is not a transition in one direction but is irregular movement, or is moving too quickly. If the result of this determination as that image variation is irregular, processing returns to step S51, and shooting and the storing thereof continue. Determination as to whether or not the image variation is large in step S52 is the same as that described previously in FIG. 9 and FIG. 10, and so detailed description will be omitted.

If the result of determination in step S52 is that image variation is large (refer to FIG. 9 and FIG. 10), it is determined whether or not there is telephoto shooting (S53). In this step, processing is carried out based on the focal length of the electronic zoom that is already set, and if it is a focal length of a predetermined value or greater telephoto shooting is determined.

If the result of determination in step S53 is that it was not telephoto shooting, step S55 is advanced to. On the other hand, if the result of determination is that there was telephoto shooting, wide-angle image shooting and recording are carried out (S54). In this step, instead of movie shooting using the telephoto lens 9t and the image sensor 6t, movie shooting using the wide-angle lens 9w and the image sensor 6w is switched to. In this way, as described in FIG. 23, since it is possible to shoot using the wide-angle shooting ranges Fw1, Fw2, and Fw3, it is possible to prevent unpleasant images being shown at the time of viewing. Recording of ambient sounds using the audio recording section 5 is also carried out at the time of shooting the wide-angle image.

Figure 25A:
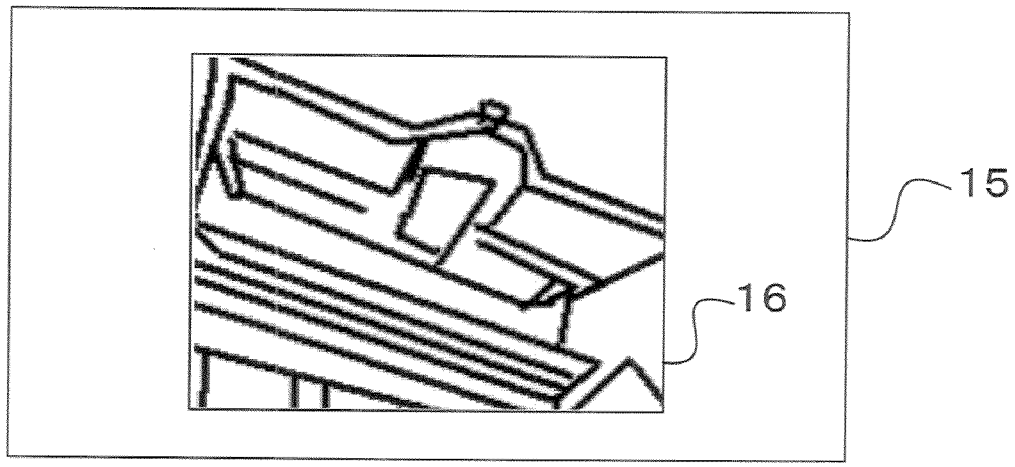
FIG. 25A and FIG. 25B are drawings showing appearance when playback displaying a taken image, in the fourth embodiment of the present embodiment, and in more detail

In this embodiment, at the time of telephoto shooting, in step S54 wide-angle shooting is switched to, and shooting is carried out so as to display a wide-angle image, as shown in FIG. 25A. However, this is not limiting and it is also possible, as shown for example in FIG. 25B, to display two images, namely a wide-angle image and a telephoto image, and to store two images at the same time. Obviously, at this time it is possible for the wide image to be made large, and for the disturbed image to be made small, and also to carry out processing on the display so that the viewer eyes do not become tired. It is also possible with this wide angle shooting, rather than fixing the angle to wide all the time, to switch the angle depending on the speed. In this case it is preferable to detect whether common sections arise in the two screens, and to control to wide-angle such that common sections do arise.

Next, it is determined whether or not there is a shooting completion operation (S55). In this step, it is determined whether or not the release button has been operated again. If the result of this determination is that there is not shooting completion, it is then determined whether or not set viewing angle image variation is small (S61).

If the result of determination in step S61 is that variation of an image at the set viewing angle is not small, processing returns to step S51, instead of viewing angle setting movie shooting is carried out, and storage of image data is resumed. On the other hand, if the variation of the image at the set viewing angle becomes small, shooting and storage at the set viewing angle are carried out (S62). Specifically, the set viewing angle before switching to a wide-angle of view in step S54 is returned to, and movie shooting is resumed.

If shooting and storage are carried out at the set viewing angle, next a detailed section subroutine for switching viewing angle similarly to step S43 is executed (S63). Specifically, viewing angle switching using the electronic zoom is also carried out during the shooting operation. If the viewing angle switching subroutine is executed, step S51 is returned to, and the previously described operations are executed.

If the result of determination in step S55 is that there has been a shooting completion operation, a shooting completion operation is carried out (S56). Specifically, the video shooting operation is terminated. If completion of the shooting operation is completed, processing is executed again from step S41.

If the result of determination in step S41 is that shooting mode is not in effect, it is playback mode, and in that case it is next determined whether or not selection of a playback image has been performed (S71). In this step, determination is carried out as to whether or not a playback image has been selected from among a plurality of movies, using a playback operation member, not shown, of the operating section 4. If the result of determination is that a playback image has not been selected, this processing flow is terminated, and processing is executed again from step S41.

If the result of determination in step S71 is that a playback image has been selected, it is then determined whether or not playback is to be carried out (S72), and if the result of determination is that playback will not be performed processing returns to step S71. On the other hand, in the case of playback, playback of the image is carried out (S73). In this step, playback of a video stored in the image storage control section 2 is carried out.

When shooting the video in step S51 to step S63, in the event that image variation is large, then since an image that has little shaking from the telephoto lens 9t is stored, playback of the image in step S73 does not have extensive shaking, and there is less likelihood of imparting an unpleasant sensation. If the image playback is terminated, processing is executed again from step S41.

In this manner, with the fourth embodiment of the present invention, it is determined whether or not movement of an image is unstable at the time of shooting (refer to S52), and if image movement is unstable a wide-angle image is shot and stored. Therefore, at the time of playback of a shot image, playback display of unpleasant images is alleviated, and it is possible to shoot movies that are easy to watch. Also, in this embodiment shooting is performed by switching images for two angles when required, and so it is possible to prevent unattractive movies.

Next, a fifth embodiment of the present invention will be described using FIG. 26. In the fourth embodiment of the present invention, in cases where movement of an image at the time of shooting becomes unstable, if telephoto shooting is in progress then wide-angle shooting is switched to, and images using wide-angle shooting are stored. With the fifth embodiment, both telephoto and wide-angle images are stored, and at the time of playback it is determined whether or not there is unstable movement in the image, and the image to be displayed is then switched based on the result of this determination.

Figure 24:
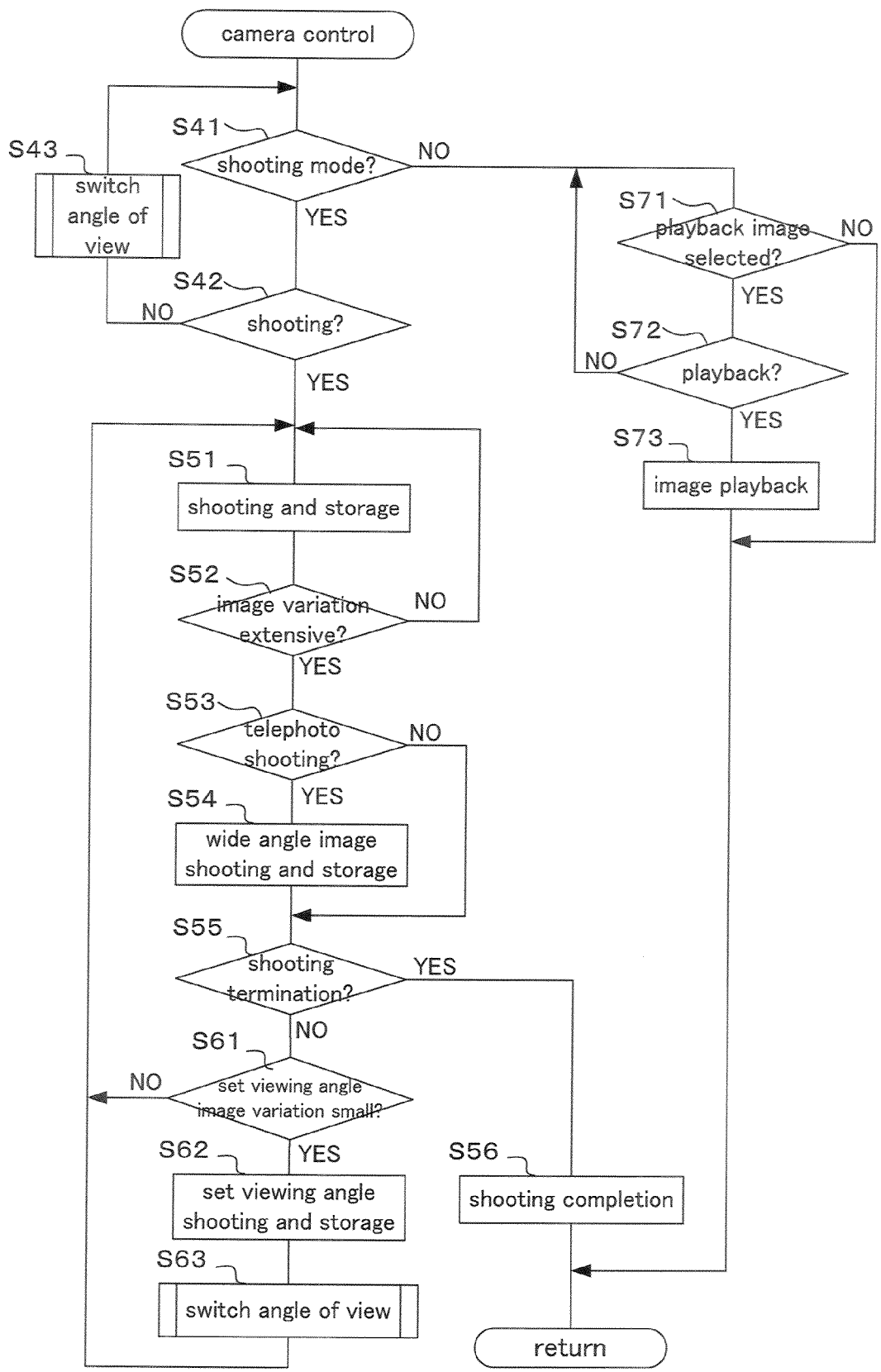
FIG. 24 is a flowchart showing operation for camera control relating to the fourth embodiment of the present invention.

The structure of the fifth embodiment is the same as the structure of the fourth embodiment shown in FIG. 17, and camera control flow shown in FIG. 24 is simply changed to the flowchart shown in FIG. 26, and so description will be given for the different processing flows.

Figure 26:
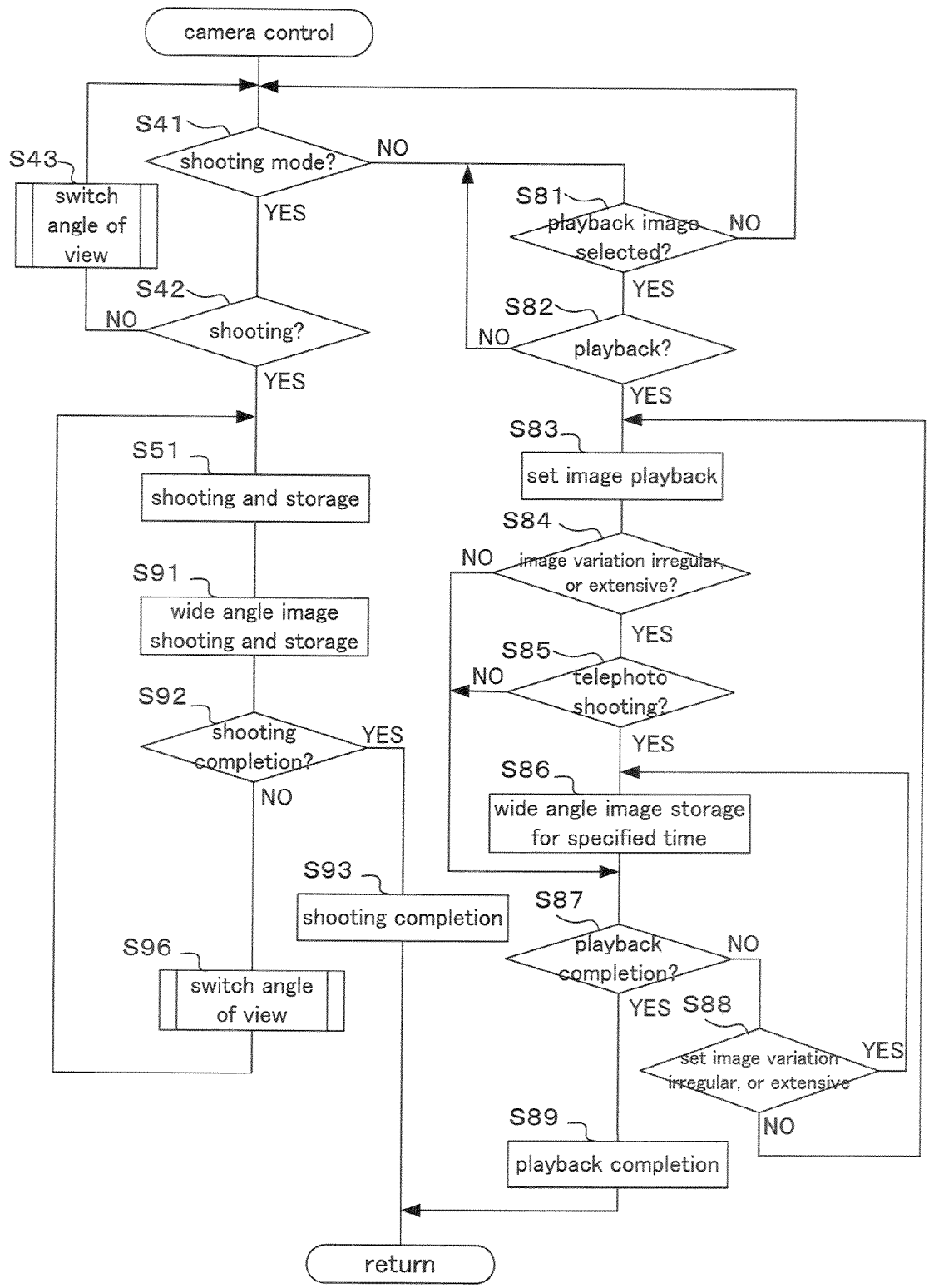
FIG. 26 is a flowchart showing operation for camera control relating to the fifth embodiment of the present invention.

If the flow shown in FIG. 26 is entered, then similarly to the fourth embodiment, it is determined whether or not it is shooting mode (S41). If the result of this determination is that shooting mode has been selected, it is then determined whether or not shooting is to be carried out (S42). If the result of this determination is that shooting is not carried out, a viewing angle switching subroutine is executed (S43), and once executed processing returns to step S41.

If the result of determination in step S42 is that shooting will be carried out, movie shooting and storage are carried out (S51). In this step, telephoto shooting is carried out using the telephoto lens 9t and the image sensor 6t, and image data is stored. Wide-angle shooting and storage is then carried out (S91). In this step, wide-angle shooting is carried out using the wide-angle lens 9w and the image sensor 6w, and image data is stored. Telephoto image shooting and wide-angle image shooting are carried out using step S51 and step S91, and respective image data is stored in the image storage control section 2. When storing image data from steps S51 and S91, focal length set by the electronic zoom is also included in the data.

Then, as in step S55, it is determined whether or not there is operation completion (S92). If the result of this determination is that there is no shooting completion operation, a viewing angle switching subroutine is executed, similarly to step S43 (S96). This is to handle a zooming operation during shooting.

If the result of determination in step S92 is that there is shooting completion, a shooting completion operation is carried out similarly to step S56 (S93). If the operation completion operation is carried out, the operation is terminated and processing is executed again from step S41. In this way, at the time of shooting, in step S51 and S91 shooting of telephoto images and wide-angle images are simultaneously stored until operation completion is determined.

If the result of determination in step S41 is that it is not shooting mode, it is then determined, similarly to step S71, whether or not a playback image has been selected (S81). If the result of this determination is that an image has not been selected, processing returns to step S41. On the other hand, if an image has been selected, it is then determined, similarly to step S72, whether or not playback will be started (S82). If the result of this determination is that playback is not started, processing returns to step S81.

On the other hand, if the result of determination in step S82 is that playback will be started, playback of a set image is commenced (S83). As described previously, a telephoto image and a wide-angle image are both stored in the image storage control section 2, and of these two images an image corresponding to a focal length that has been set as the electronic zoom is read out, and subjected to playback display on the display section 8.

Next, it is determined whether variation of the set image is irregular, or if variation is extensive (S84). In this step it is determined whether or not the variation in the set image is irregular movement or variation in speed, such that it has a detrimental effect on viewing appreciation, such as making the viewer feel nauseous. Whether the image changes irregularly, or whether change is extensive, is determined similarly to FIG. 13 and FIG. 14 described above, and so detailed description will be omitted here.

If the result of determination in step S84 is that variation of the set image is not irregular, or that variation is extensive, it is then determined whether or not this set image is telephoto shooting (S85). If the result of this determination is that it was telephoto shooting, a wide-angle image is played back for a specified time (S86). In this step image data for a wide-angle image that was stored in step S91 is read out, and playback displayed for a specified period of time. The prescribed time is from 1 to 3 seconds, but if it is shorter there is a problem that images are changed more frequently, while if it is long there is a possibility that playback of an image the photographer intended may be missed, and so it can be appropriately selected.

Once playback of the wide-angle image of step S86 has been carried out, or if the result of determination in step S84 is that image variation of the set image is not irregular or is not extensive, or if the result of determination in step S85 is that it is not telephoto shooting, it is then determined whether or not there is playback termination (S87). If the result of this determination is that is that there is not playback termination, it is then determined whether or not variation of the set image is irregular or extensive (S88).

If the result of determination in step S88 is that the variation of the set image is irregular or extensive, processing returns to step S86, and playback display of the wide-angle image continues. On the other hand, if the variation of the set image is not irregular or extensive, then image movement of the set image is no longer unstable so processing returns to step S83, and playback display of the set image is carried out.

If the result of determination in step S87 is that there is playback termination, the playback operation is terminated (S89), and once this processing flow is terminated processing from step S41 is executed again.

In this way, with the fifth embodiment of the present invention, at the time of shooting both a telephoto image and a wide-angle image are stored simultaneously, while at the time of playback a set image is first subjected to playback display, and at this time variation in the set image is judged, and in the case where unstable operation has been carried out it is determined whether or not the set image is a telephoto image, and if it is a telephoto image then a wide-angle image is switched to and playback display is performed with this wide-angle image. Therefore, even in cases where a telephoto image moves in an unstable manner, it is possible to view a stable image because a wide-angle image is switched to, and it is possible to prevent the viewer being subjected to discomfort due to unstable movement. Also, since playback display is carried out by appropriately switching between a telephoto image and a wide-angle image, it is possible to perform playback with a lot of variation.

Figure 25B:
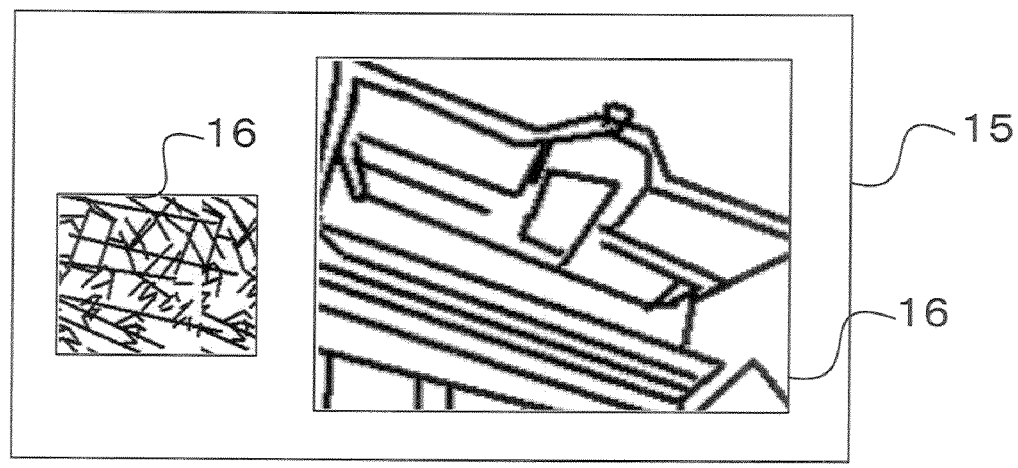

With this embodiment, images are automatically switched in the case of unstable movement, but in this type of situation also, in cases where it is desired to see a telephoto image, it is also possible to manually return to the telephoto image. As shown in FIG. 25B, it is possible for two images to be displayed, with the telephoto image displayed as a small image and the wide-angle image displayed as a large image.

In this manner, with the fourth and fifth embodiments of the present invention, it is determined whether or not movement of an image is unstable, and if it is unstable a wide-angle image is switched to. Therefore, movie shooting is made easy, and it is easy to bestow variation on dull movie shoots, and it is possible to shoot movies so that it is a more pleasant experience for the viewer. Also, if a movie being shot, disturbance of the movie, due to the camera movement, which is inevitable, is alleviated by complementing with an image that is not disordered, and so it becomes possible for even a non-professional to shoot a movie that is easy to watch.

Also, in the fourth and fifth embodiments effective ranges of image data taken with at least two fixed focal length lenses are changed in a stepwise manner, and as a result high magnification factor electronic zoom is realized. In particular, with image sensors 6$t$ and 6$w$ for forming images using first and second fixed focal length lenses (telephoto lens 9$t$ and wide-angle lens 9$w$) an interval between focal lengths does not overlap, and so it is possible to give a high zoom magnification factor.

In the fourth and fifth embodiments, a telephoto shooting section and a wide-angle shooting section have been described centering on types having respective lenses, but it is also possible to obtain images for various angles of view from an image sensor on which images are formed using a single lens. In this case also, when disturbance to an image shot in a narrow range arises, a difficult movie shoot is simplified by widening the effective range of the image sensor, which is the same for each of the embodiments of the present invention, it is made easier to impart variation to a dull movie shoot, and it is possible to shoot movies that are a pleasant experience for the viewer.

As has been described above, there are cases where a user who has in the past only shot still pictures may not know what situations are good for shooting movies, and even if they do try shooting a movie they may not know at what point in time it is best to stop shooting the movie. In this situation, finished work is often shoddy and amateurish. However, with each of the embodiments of the present invention, variation is bestowed on movie shooting, and many users can readily shoot to produce good looking images. This is achieved by imparting variation to shot movies. Also, it is easy for movies to become disordered due to unstable framing, such as hand shake or panning at the time of movie shooting with a small camera. With each of the embodiments of the present invention, however, these types of unpleasant scenes are effectively dealt with and it is possible to make the images sharp.

In each of the embodiments of the present invention, an example has been shown where shooting is carried out with a camera 10, and playback is enjoyed, but this is not limiting, and it is also possible for playback to be enjoyed on a personal computer or television, for example. In the case of viewing images on a personal computer or television or the like, it is possible to store image data of the movies taken with the camera 10.

Also, in each of the embodiments of the present invention, the camera 10 carries out movie shooting and playback, but similarly to a normal camera it goes without saying that it is also possible to have a function for shooting and playing back still images.

Further, each of the embodiments of the present invention has been described using a digital camera as the device for shooting, but there is no problem in having a digital single lens reflex camera or a compact digital camera as the camera, or a camera of the type incorporated into a mobile telephone, mobile information terminal (PDA (Personal Digital Assistant), game console, etc.

The present invention is not limited to these embodiments, and structural elements may be modified in actual implementation within the scope of the gist of the embodiments. It is also possible form various inventions by suitably combining the plurality structural elements disclosed in each of the above described embodiments. For example, it is possible to omit some of the structural elements shown in the embodiments. It is also possible to suitably combine structural elements from different embodiments.

What is claimed is:

1. An image processing device comprising:
   a storage section for respectively storing first moving image data and second moving image data of a field of view that is different from the first moving image data;
   a movement pattern detection section for processing the first moving image data to detect a movement pattern of a first moving image represented by the first moving image data;
   a movement pattern determination section for determining whether or not the movement pattern of the first moving image is unstable; and
   an image processing section for replacing an image of an unstable period of the first moving image data, for which it has been determined by the movement pattern determination section that the movement pattern of the first moving image is unstable, using the second moving image data.

2. An image processing method comprising:
   storing first moving image data and second moving image data of a field of view that is different from the first moving image data;
   processing the first moving image data to detect a movement pattern of a first moving image represented by the first moving image data;
   determining whether or not the movement pattern of the first moving image is unstable; and
   replacing an image of an unstable period of the first moving image data, for which it has been determined that the movement pattern of the first moving image is unstable, using the second moving image data.

3. An image playback device comprising:
   a storage section for storing first moving image data and second moving image data respectively converted from a first moving image and a second moving image;
   a movement pattern detection section for processing, when the first moving image data stored in the storage section is read out and played back, the first moving image data to detect a movement pattern of the first moving image represented by the first moving image data;
   a movement pattern determination section for determining whether or not the movement pattern of the first moving image is unstable;
   an image processing section for replacing an image of an unstable period of the first moving image data, for which it has been determined by the movement pattern determination section that the movement pattern of the first moving image is unstable, using the second moving image data; and
   an image display section for displaying the first moving image that has been processed by the image processing section, or the second moving image.

4. A non-transitory computer readable storage medium storing a program, which when executed by a computer causes the computer to perform playback, comprising:
   storing first moving image data and second moving image data;
   when the stored first moving image data is read out and played back, processing the first moving image data to detect a movement pattern of a first moving image represented by the first moving image data;
   determining whether or not the movement pattern of the first moving image is unstable;
   rewriting an image of an unstable period of the first moving image data, for which it has been determined, in an image processing section, that the movement pattern of the first moving image is unstable, using the second moving image data; and
   displaying the first moving image or a second moving image represented by the second moving image data based on the first moving image data or the second moving image data that has been rewritten.

5. An imaging device comprising:
   an imaging section for generating first moving image data representing a first moving image of a first shooting range, and second moving image data representing a second moving image of a second shooting range that is wider than the first shooting range;
   a storage section for storing the first moving image data and the second moving image data;
   a determination section for determining whether or not movement of the first moving image is unstable; and
   an image data synthesis section for filling in gaps in image data at sections, in the first moving image data, that have been determined by the determination section to be unstable, using the second moving image data taken at a time corresponding to the sections.

6. The imaging device of claim 5, wherein
   the image synthesis section performs control so that for segments of image data, within the first image data, which the determination section has determined as unstable, second image data corresponding to these segments is stored in the image data storage section.

7. The imaging device of claim 5, wherein
   the image data storage section stores the first moving image data and the second moving image data simultaneously and in parallel, and the image data synthesis section performs control so that image data for segments of image data, within the first moving image data, which have determined as unstable by the determination section, are replaced by second moving image data corresponding to these segments.

8. The imaging device of claim 5, wherein
the imaging section has a first imaging section provided with a first zoom section, and a second imaging section provided with a second zoom section with a different angle of view to the first imaging section.

9. The imaging device of claim 8, wherein
a shooting angle of view that can be adjusted by the first zoom section, and a shooting angle of view that can be adjusted by the second zoom section, do not overlap with each other.

10. The imaging device of claim 5, wherein
the determination section determines that movement of the first is unstable when the first image moves at greater than or equal to a specified speed.

11. The imaging device of claim 5, further comprising a shake detection section for detecting an amount of shake of the first image, and wherein the determination section determines that movement of the first image is unstable when amount of shake of the first image is greater than or equal to a specified amount.

12. An imaging method comprising:
generating first moving image data representing a first moving image of a first shooting range, and second moving image data representing a second moving image of a second shooting range that is wider than the first shooting range;
storing the first moving image data and the second moving image data;
determining whether or not movement of the first moving image is unstable; and
filling in gaps in moving image data at sections, in the first moving image data, that have been determined by the determination section to be unstable, using the second moving image data taken at a time corresponding to the sections.

13. An image processing device comprising:
an image data storage section for storing first moving image data representing a first moving image of a first shooting range, and second moving image data representing a second moving image of a second shooting range that is wider than the first shooting range;
a determining section for determining whether or not movement of the first moving image is unstable; and
an image data synthesis section for filling in gaps in moving, image data at sections, in the first image data, that have been determined by the determination section to be unstable, using the second moving image data taken at a time corresponding to the sections.

14. The image processing device of claim 13, wherein
the determination section determines that movement of the first is unstable when the first image moves at greater than or equal to a specified speed.

15. The image processing device of claim 13, wherein
the determination section determines that movement of the first is unstable when amount of shake of the first image is greater than or equal to a specified value.

16. An image processing method, comprising:
storing first moving image data and second moving image data;
determining whether or not movement of the first moving image data is unstable; and
filling in gaps in image data at sections, in the first image data, that have been determined by the determination section to be unstable, using the second moving image data taken at a time corresponding to the sections.

17. A non-transitory computer readable storage medium storing a program, which when executed by a computer causes the computer to perform an image playback, comprising:
storing first moving image data and second moving image data;
when the stored first moving data is read out and played back, determining whether or not movement of the first moving image data is unstable; and
filling in gaps in moving image data at sections, in the first moving image data, that have been determined by the determination section to be unstable, using the second moving image data taken at a time corresponding to the sections.

* * * * *